United States Patent [19]
Rohrberg

[11] Patent Number: 5,960,687
[45] Date of Patent: Oct. 5, 1999

[54] HIGH-PRECISION CUTTING AND BORING MILL

[76] Inventor: Roderick G. Rohrberg, 2742 W. 234th St., Torrance, Calif. 90505

[21] Appl. No.: 08/978,521

[22] Filed: Nov. 25, 1997

Related U.S. Application Data

[63] Continuation-in-part of application No. 08/458,624, Jun. 2, 1995, Pat. No. 5,692,421, which is a continuation-in-part of application No. 08/090,392, Jul. 9, 1993, Pat. No. 5,531,370, which is a continuation-in-part of application No. 07/762,713, Sep. 19, 1991, abandoned, which is a continuation-in-part of application No. 07/567,951, Aug. 14, 1990, abandoned.

[51] Int. Cl.$^6$ ..................................................... B23B 27/00
[52] U.S. Cl. ........................................ 82/1.2; 82/1.4; 82/1.5; 82/141
[58] Field of Search ............................... 82/1.2, 1.3, 1.4, 82/1.5, 70.2, 82, 98, 118, 119, 141; 408/153, 161, 163, 164, 173

[56] References Cited

U.S. PATENT DOCUMENTS

| | | |
|---|---|---|
| 3,592,553 | 7/1971 | Heizer ................................ 82/1.2 X |
| 3,710,659 | 1/1973 | Pagella et al. ......................... 82/1.2 |
| 4,250,775 | 2/1981 | Jerue et al. ........................ 82/1.2 X |
| 4,375,773 | 3/1983 | Liermann .............................. 82/1.2 |
| 5,120,167 | 6/1992 | Simpson ........................... 82/1.2 X |
| 5,396,821 | 3/1995 | Okumura et al. ..................... 82/1.3 |
| 5,692,421 | 12/1997 | Rohrberg .............................. 82/1.2 |

*Primary Examiner*—Andrea L. Pitts
*Assistant Examiner*—Henry W. H. Tsai
*Attorney, Agent, or Firm*—Anglin & Giaccherini

[57] ABSTRACT

A Cutting & Boring Tool which is capable of performing both conventional milling and high-precision automated machining operations is disclosed. One preferred embodiment of the invention comprises a compact Boring Mill (200) which includes five independently controlled and operated drive mechanisms: a spindle rotation motor (202) for rotating a spindle (208), a Z-axis spindle drive motor (204), a tool bit advance mechanism (206) which functions like a continuously variable transmission and which regulates the radial advance of a tool bit (211) and X-and-Y axis motors (218, 220), which provide motion along the side-to-side (X) and front-to-back axes (Z). A variety of tool bits (211) may be employed to drill, bore and form internal and external contours in a workpiece (212) made from metal, plastic or a composite material. The invention is extremely useful as part of an integrated CNC Machining System.

7 Claims, 31 Drawing Sheets

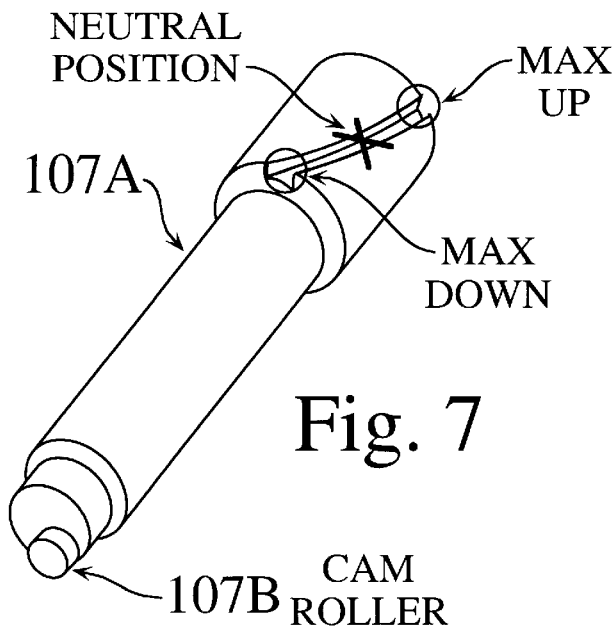
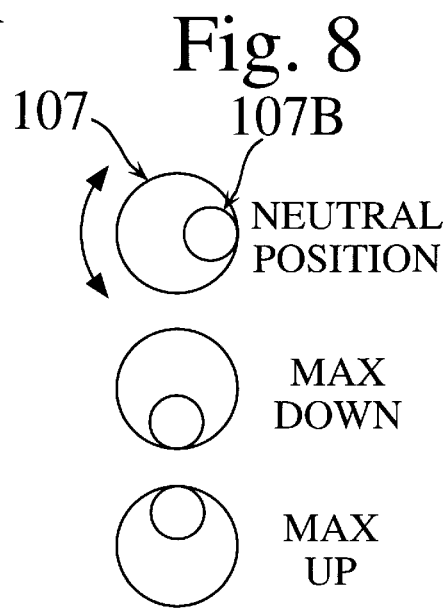
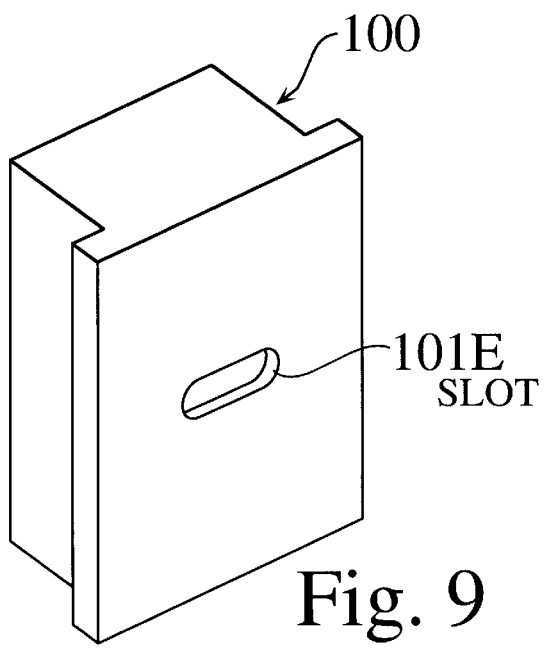
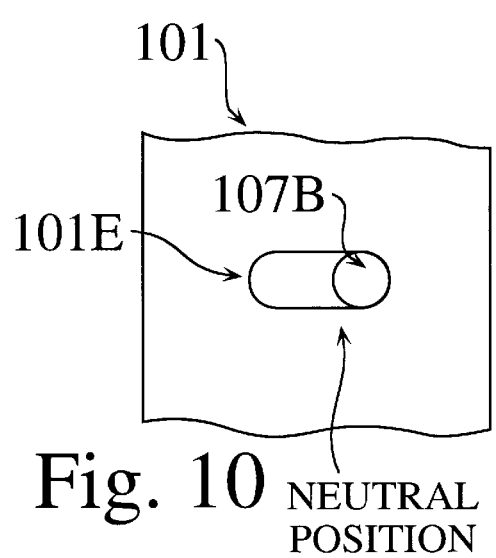
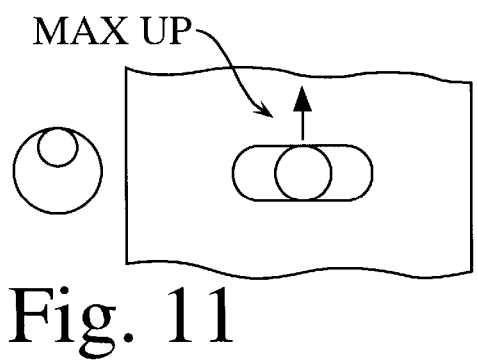
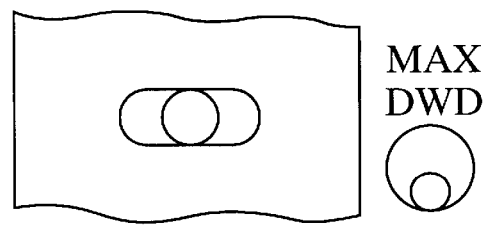

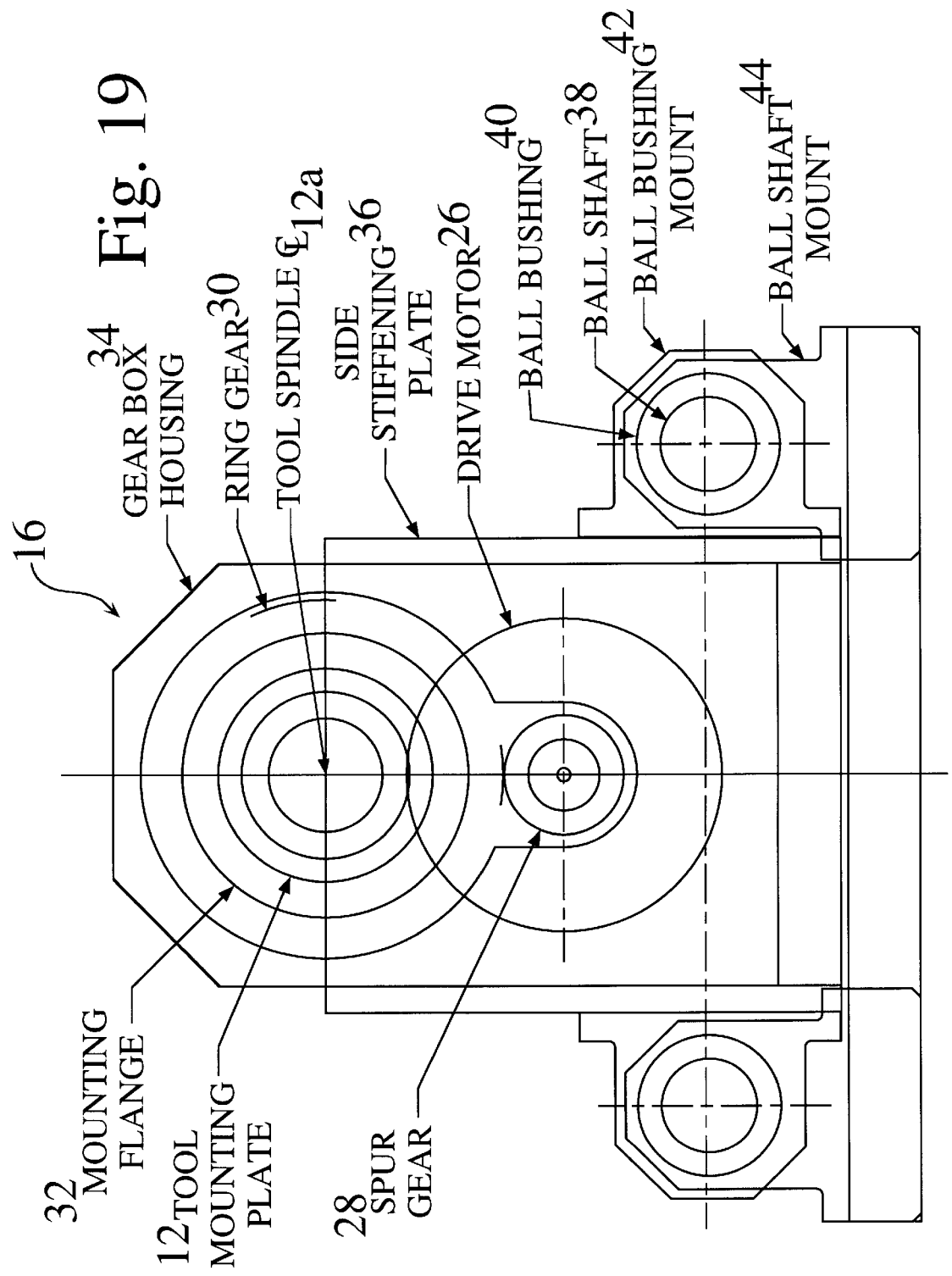

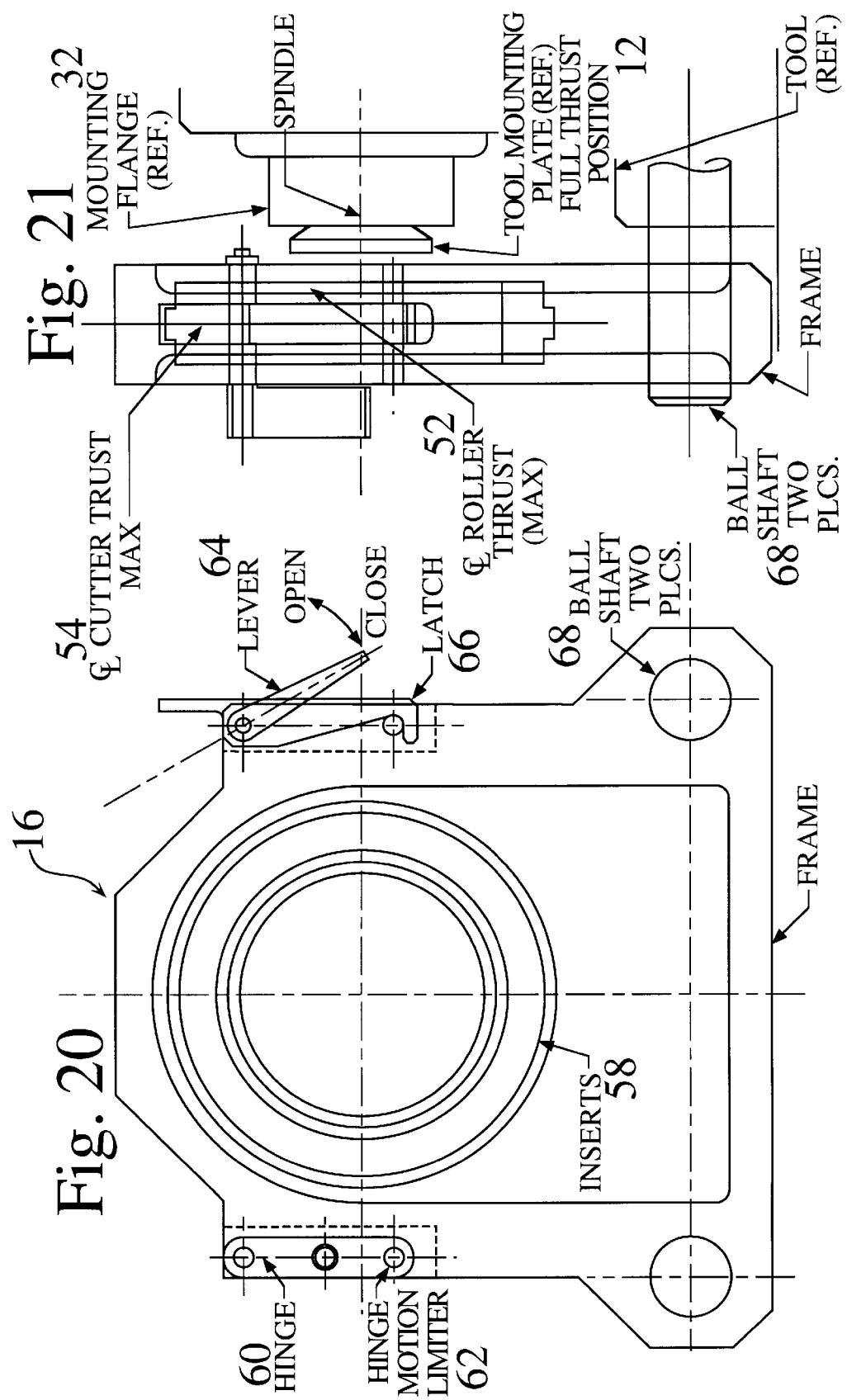

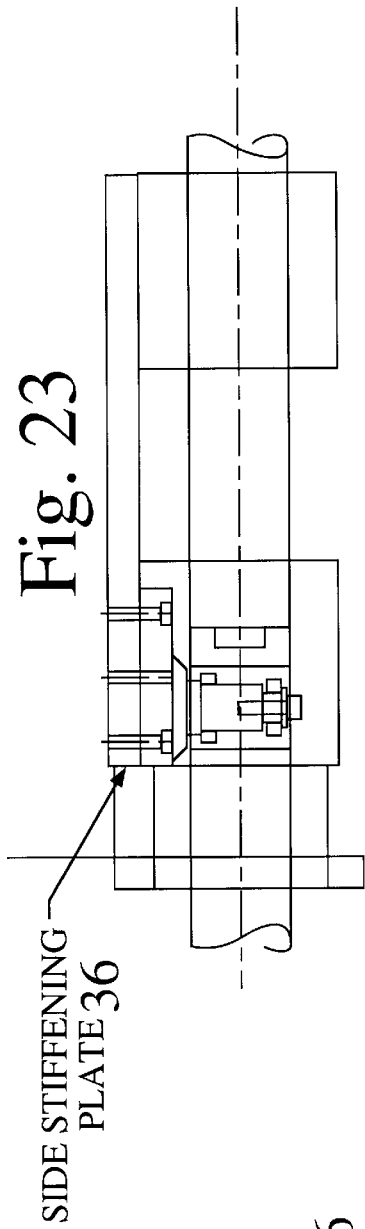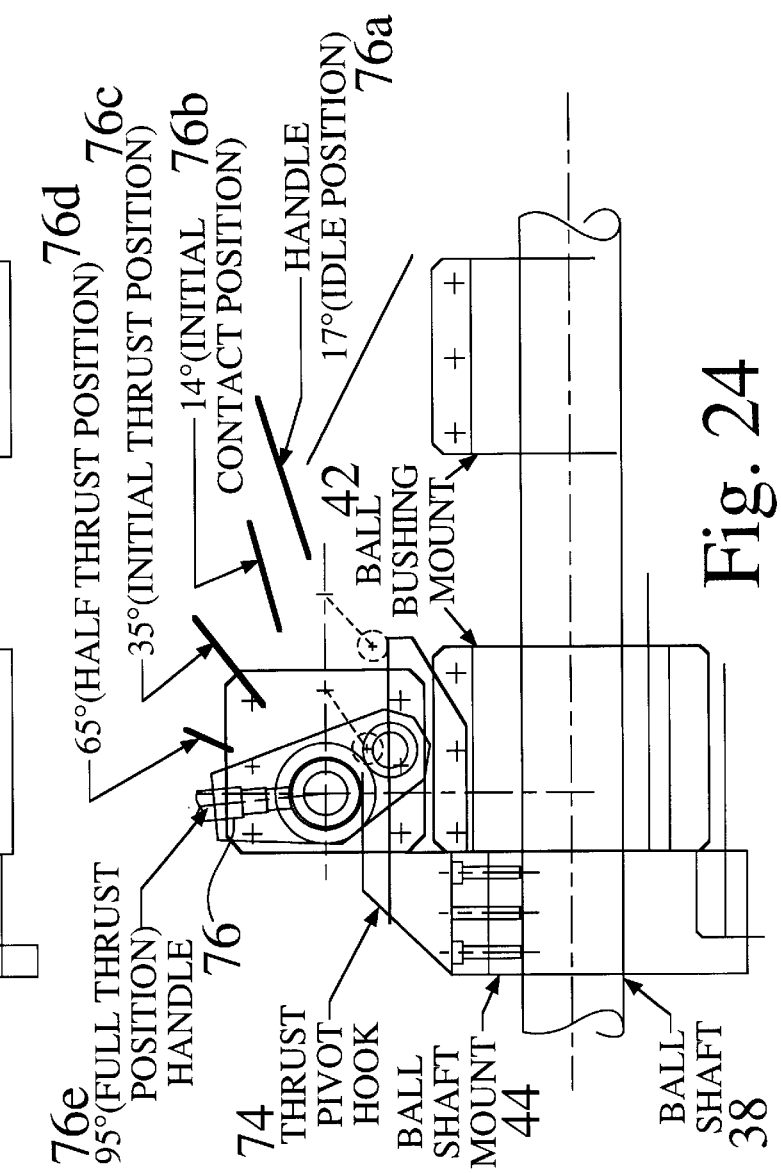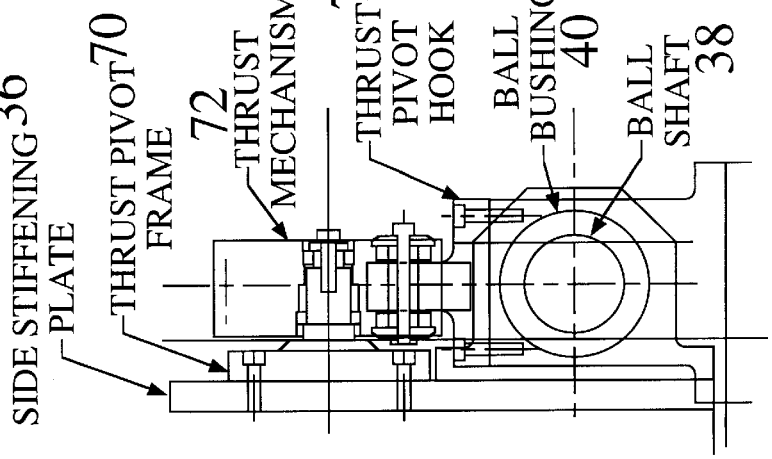

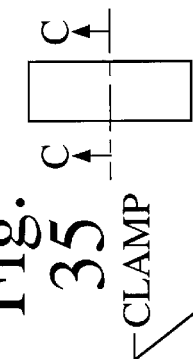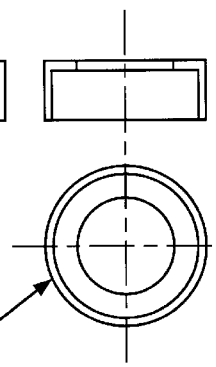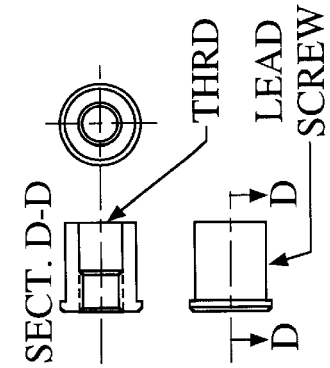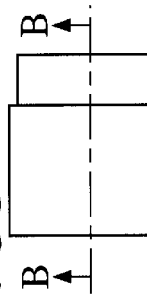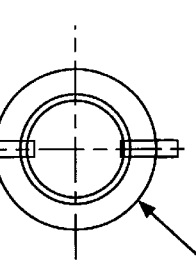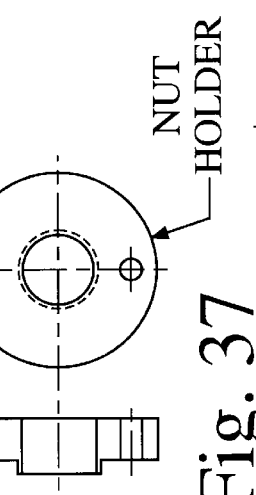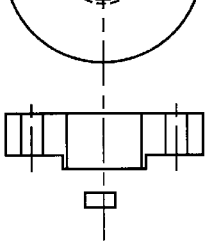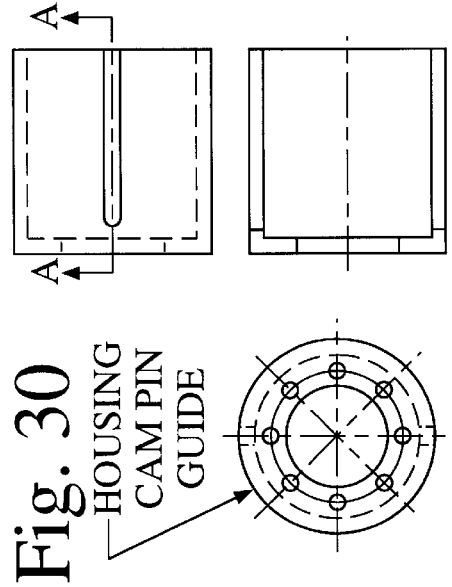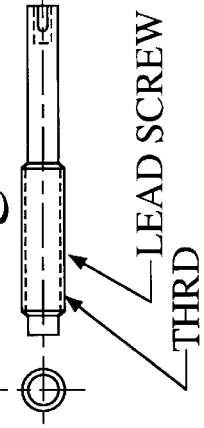

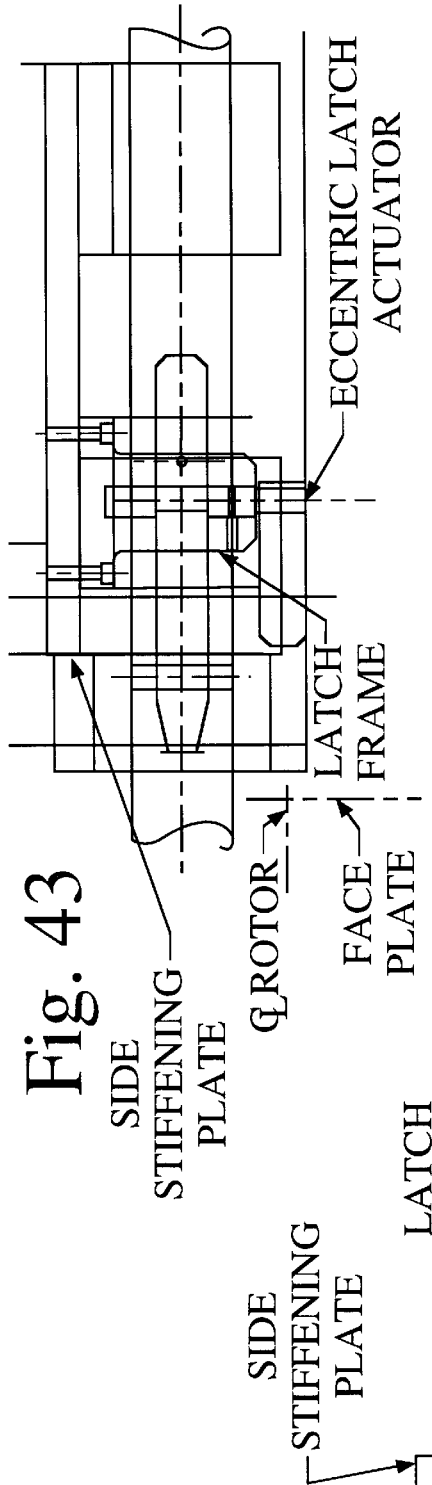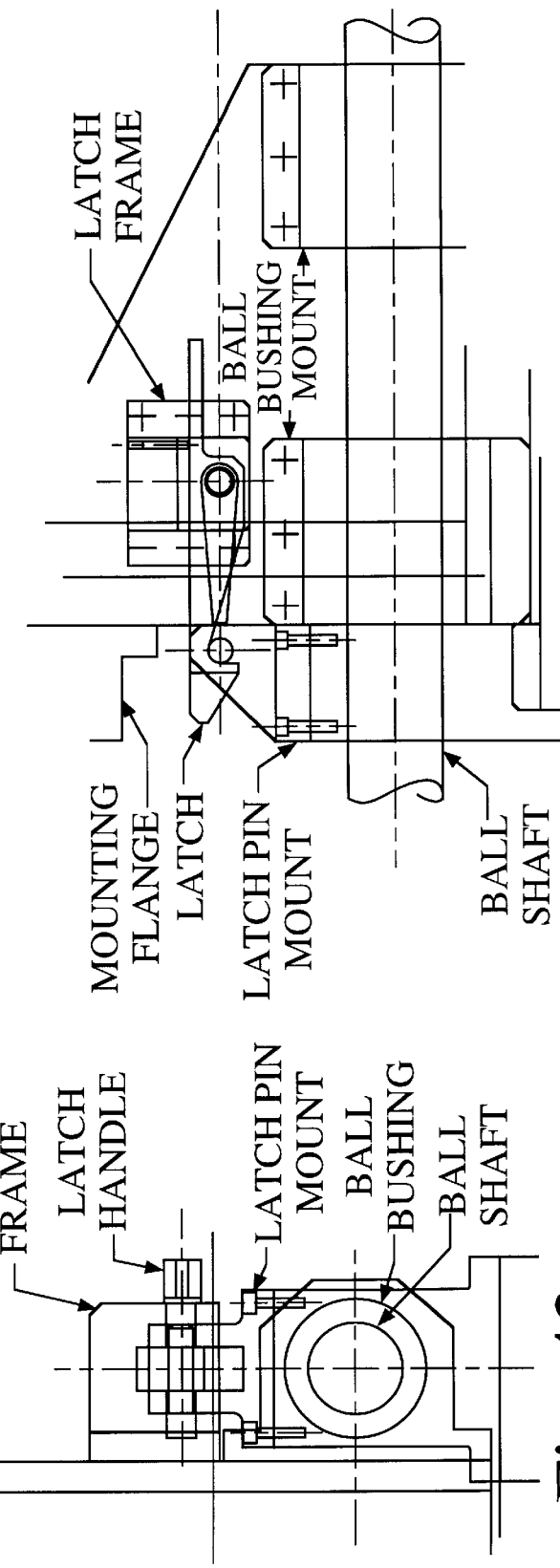

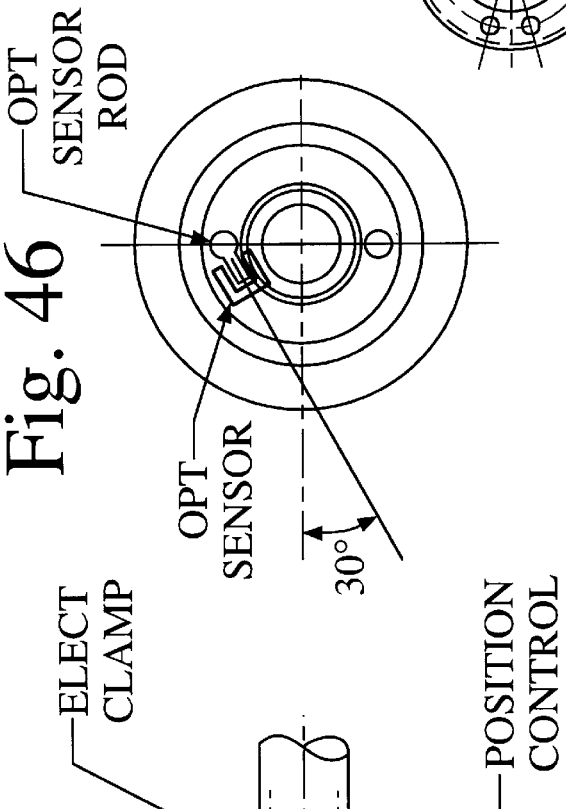
Fig. 46 · Fig. 47
OPT SENSOR ROD
OPT SENSOR
30°
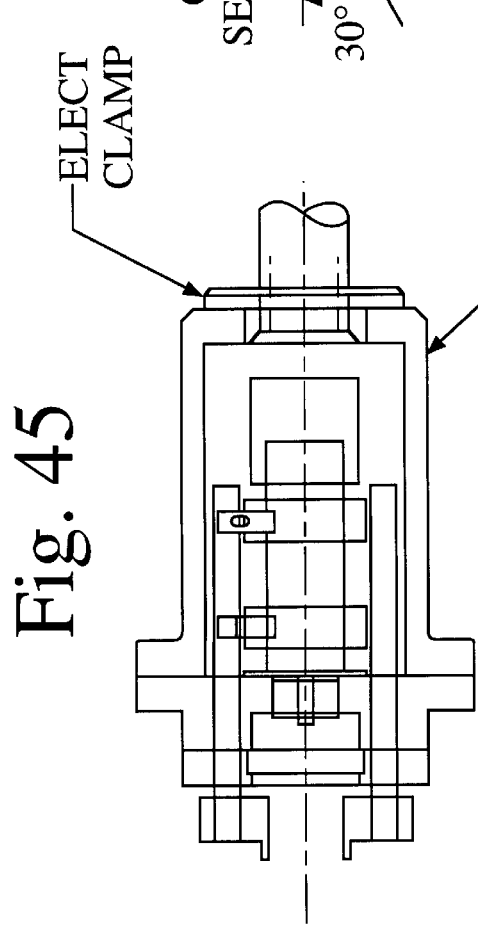
Fig. 45
ELECT CLAMP
POSITION CONTROL
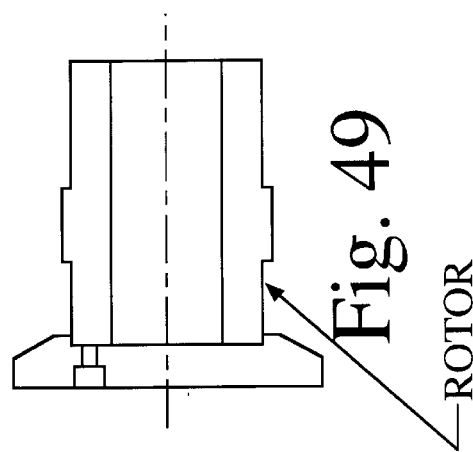
Fig. 49 · Fig. 50
ROTOR
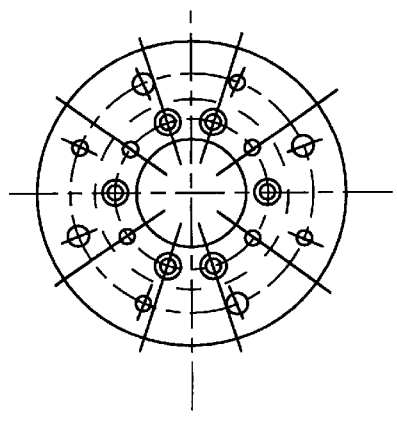
Fig. 48

ENTRY TOOLS
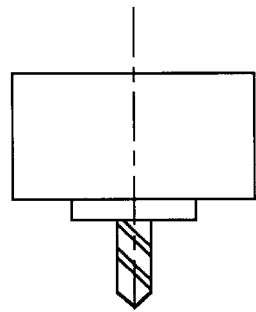 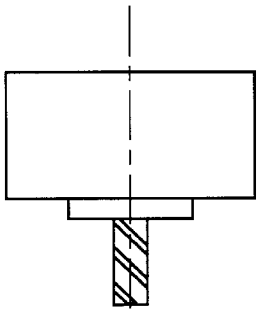
DRILL  END MILL
Fig. 51  Fig. 52
INTERNAL BORING TOOLS
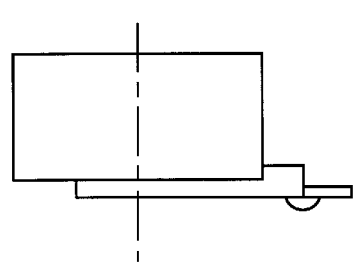 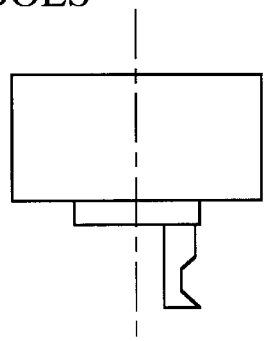
LARGE DIA.  SMALL DIA.
Fig. 53  Fig. 54
EXTERNAL CUTTING TOOLS
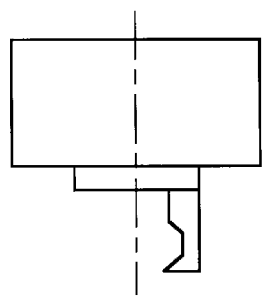
Fig. 55
SMALL DIA.

HIGH-PRECISION CUTTING AND BORING MILL

CROSS REFERENCE TO RELATED PATENT APPLICATIONS & CLAIMS FOR PRIORITY

The present patent application is a Continuation-in-Part Application based on a commonly-owned and allowed Application entitled High-Precision Cutting Tool System, which was filed on Jun. 2, 1995 now U.S. Pat. No. 5,692,421 and which was assigned U.S. patent application Ser. No. 08/458,624. U.S. patent application Ser. No. 08/458,624 is a Continuation-in-Part application Ser. No. 08/090,392 based on U.S. Pat. No. 5,531,370 entitled High-Precision Sizing, Cutting and Welding Tool System for Specialty Aerospace Alloys. U.S. Pat. No. 5,531,370 is a Continuation-in-Part Application of High-Precision Sizing, Cutting and Welding Tool System, which was filed on Sep. 19, 1991 and which was assigned U.S. patent application Ser. No. 07/762,713, and which is now abandoned. U.S. patent application Ser. No. 07/762,713 is also a Continuation-in-Part patent Application based on a commonly-owned parent Application entitled High-Precision Sizing Tool System which was filed on Aug. 14, 1990, which was assigned U.S. Ser. No. 07/567,951 and which is now abandoned. The Applicant hereby claims the benefit of priority of all filing dates for any and all subject matter that is commonly disclosed in these previous and the pending Patent Applications.

FEDERALLY SPONSORED RESEARCH OR DEVELOPMENT

Not applicable.

FIELD OF THE INVENTION

The present invention includes methods and apparatus for forming internal and external contours a variety of metal, plastic, composite or other types of workpieces. More particularly, the High-Precision Cutting & Boring Mill is a compact, versatile and highly effective machine tool that is capable of drilling, boring, cutting and forming precise recesses in a solid object. The Cutting & Boring Mill is highly adaptable to a wide variety of machine tools, mills, boring machines, lathes and CNC systems. The present invention is capable of making tapers, "O" ring grooves and bores in many different workpieces.

BACKGROUND OF THE INVENTION

The aerospace industry in the United States is rapidly being confronted with obsolete fabrication technology and equipment that cannot keep pace with the technological requirements of today's and tomorrow's aircraft requirements. Each year the machine tool industry encounters new demands of engineers who specify increasingly complex machining processes for the manufacture of metal parts. One of greatest challenges confronting designers in the precision metal working industry is finding more precise and dependable techniques to cut or to bore metal or plastic parts that may have exceedingly small dimensional tolerances or that may be fabricated from exotic alloys, such as titanium, Inconel™ or hybrid stainless steels. The aircraft and aerospace industries are constantly confronted by difficulties that arise when hollow cylindrical metal conduits need to be severed or when a precise recess must be formed in a plastic or metal part.

Titanium and its alloys have material properties that make it especially desirable for special applications, particularly within the aerospace industry. First, titanium has a high strength-to-weight ratio, which makes it comparable to many steels and stainless steels, while being only about 56 percent as heavy. While titanium alloys are about 40 percent heavier than aluminum, their greater strength allows much less material to be used for many applications. Titanium alloys also possess good corrosion resistance, and high heat performance which makes them even more desirable for aerospace applications.

Despite the desirable properties that titanium alloys possess, the high cost of the material and difficulties with production and fabrication with titanium alloys have limited their widespread use. Titanium alloys tend to be very unforgiving when standard fabrication methods are employed. They are at least as difficult to work with as hybrid stainless steel alloys.

Several previous attempts to solve the problem of providing effective, high-precision cutting and boring tools have met with mixed results.

In U.S. Pat. No. 5,209,617, Heule describes a deburring tool that includes a knife housing that extends downward. Heule states that his invention is designed to debur bores of a "significantly reduced diameter".

In U.S. Pat. No. 4,162,867, Calcaterra et al. disclose a dual cutter boring head which comprises a cylindrical body having side-by-side, tool-holding slides mounted diametrically on the boring head.

In U.S. Pat. No. 4,375,773, Liemann describes an oscillating cutting toolhead having an oscillating cutter which includes two blades which are prestressed radially inwardly.

In U.S. Pat. No. 4,741,231, Patterson et al. disclose a tool force sensor assembly that generates an electrical signal which is related to the change in force applied by a tool to a workpiece. The signal indicates the wear condition or failure of the tool.

In U.S. Pat. No. 4,637,285, Mizoguchi describes an automatic feed device for a facing head comprising a shank mounted to the main shaft of a machine tool.

In U.S. Pat. No. 4,612,831, Lehmkuhl discloses a boring machine having a tapered shank that is received in a spindle with a pre-loaded adjustable boring bar.

In U.S. Pat. No. 3,710,659, Pagella et al. describe a tool holding device in which the tool slides in the holder to enable a radial motion with respect to the axis of rotation of a holding device.

A Patent issued by the Soviet Union in 1979 entitled "Diamond-Reaming" (No. 0880636) depicts a head comprising a boring cutter which is mounted in a cover.

The problem of providing a high-precision tool that can be used to cut and bore metals, plastics, composites and other materials has presented a major challenge to engineers and technicians in the materials industry. The development of an accurate and versatile system that overcomes the difficulties encountered when conventional cutters or boring machines are utilized would constitute a major technological advance in the metal fabrication business. The enhanced performance that could be achieved using such an innovative device would satisfy a long felt need within the industry and would enable machine tool equipment manufacturers and users to save substantial expenditures of time and money.

SUMMARY OF THE INVENTION

The High-Precision Cutting & Boring Mill disclosed and claimed below solves many problems encountered by conventional machine tool devices. The Cutting & Boring Mill is capable of precisely and permanently boring and forming contours in metal, plastics, composites and other materials.

A preferred embodiment of the Cutting & Boring Mill is controlled by five independently controlled and operated motors, including an innovative tool advance assembly that converts translational motion to precise radial motion which governs the action of a tool bit as it forms a contour in metal, plastic, composite or other type of workpiece. A preferred embodiment of the invention includes a spindle rotation motor, a Z-axis spindle motor, a tool bit advance mechanism, an X-axis motor and a Y-axis motor. The tool bit advance mechanism is mounted inside a housing that encloses a spindle. Both the spindle and the advance mechanism may be moved along the Z-axis of the Mill by the Z-axis spindle motor. The advance mechanism functions like a continuously variable transmission that controls the radial motion of a tool bit.

The tool bit advance mechanism comprises a shaft bearing a revolving cam roller is received by a horizontal slot in a tool bit holder that is constrained to move back and forth in a radial direction. When the cam roller moves in its circular pathway, the tool bit holder is constrained to move perpendicular to the longitudinal axis of the cam shaft and engages the workpiece. The rotational motion of the cam shaft is, in turn, controlled by the twisting of spiral guidance channels formed in a cup which resides at the opposite end of the cam shaft. These spiral channels are designed to receive a cam pin, which is held in place by a cam housing that surrounds the cam shaft. A second separate guide cup surrounds both the cam housing and the cam shaft located inside the cam housing. When the cam housing moves forward toward the workpiece, the upper portion of the cam pin which it bears is constrained to move only in a straight line parallel to the long axis of the cam shaft by slots formed along the separate guide cup which surrounds the cam housing. The lower portion of the same cam pin extends through the cam housing and engages a spiral channel on the cam shaft. When the cam pin moves, the spiral channels cause the cam shaft to rotate, which forces the cam roller to move in a circular path. The circular motion of the cam roller moves the tool bit back and forth along a radial direction.

The Cutting & Boring Mill is highly adaptable to a wide variety of machine tools, mills, boring machines, lathes and CNC systems. The present invention is capable of making machined tapers, "O" ring grooves and bores in machined parts in metals, plastics, composites and other materials.

An appreciation of other aims and objectives of the present invention and a more complete and comprehensive understanding of this invention may be achieved by studying the following description of a preferred embodiment and by referring to the accompanying drawings.

A BRIEF DESCRIPTION OF THE DRAWINGS

Figure 4:
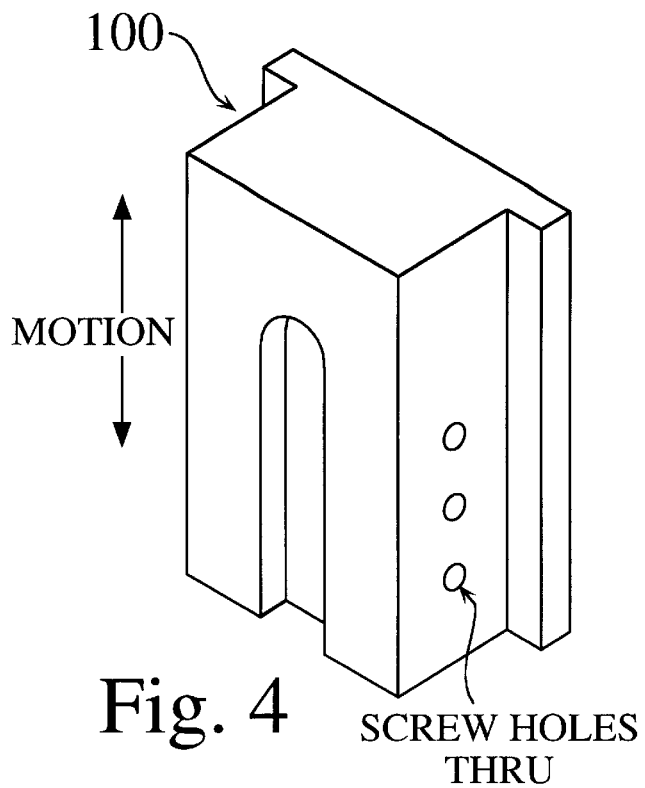
Figure 5:
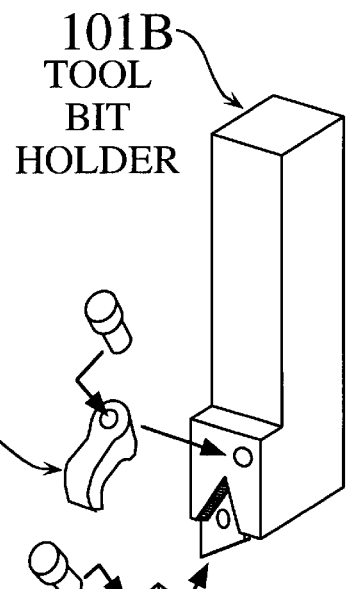
Figure 6:
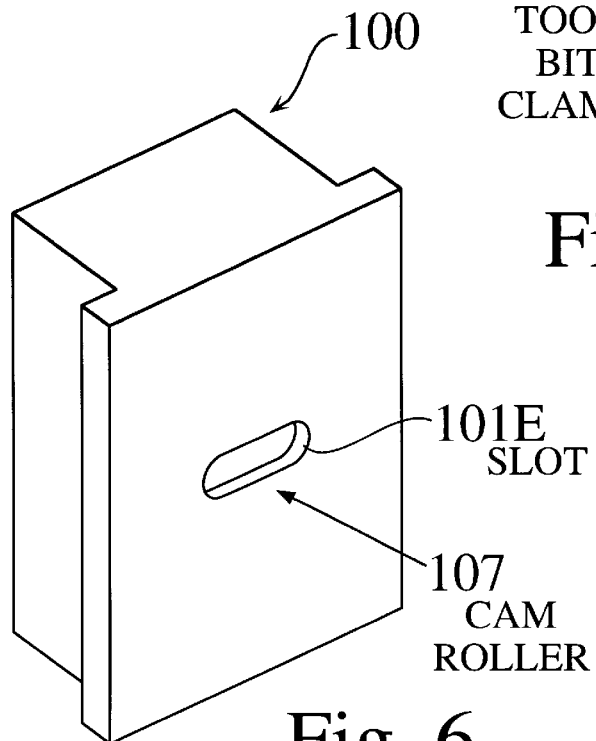

FIG. 4 presents a perspective view of the front side of a tool bit slide block. FIG. 5 shows the tool bit holder that slides up into the tool bit slide block depicted in FIG. 4. FIG. 6 exhibits the back side of the tool bit holder shown in FIG. 4.

FIG. 7 is a perspective view of a cam roller. FIG. 8 shows three different views of the front end of the cam roller, exhibiting the neutral, maximum down and maximum up positions.

FIG. 9 is another view of the back side of the tool bit side block, while FIG. 10 is an enlarged view of the cam roller slot formed in the rear side of the tool bit slide block.

FIGS. 11 and 12 are paired views of the front end of the cam roller and views of the cam roller in the same position while engaged in the cam roller slot formed in the tool bit slide block.

Figure 13:
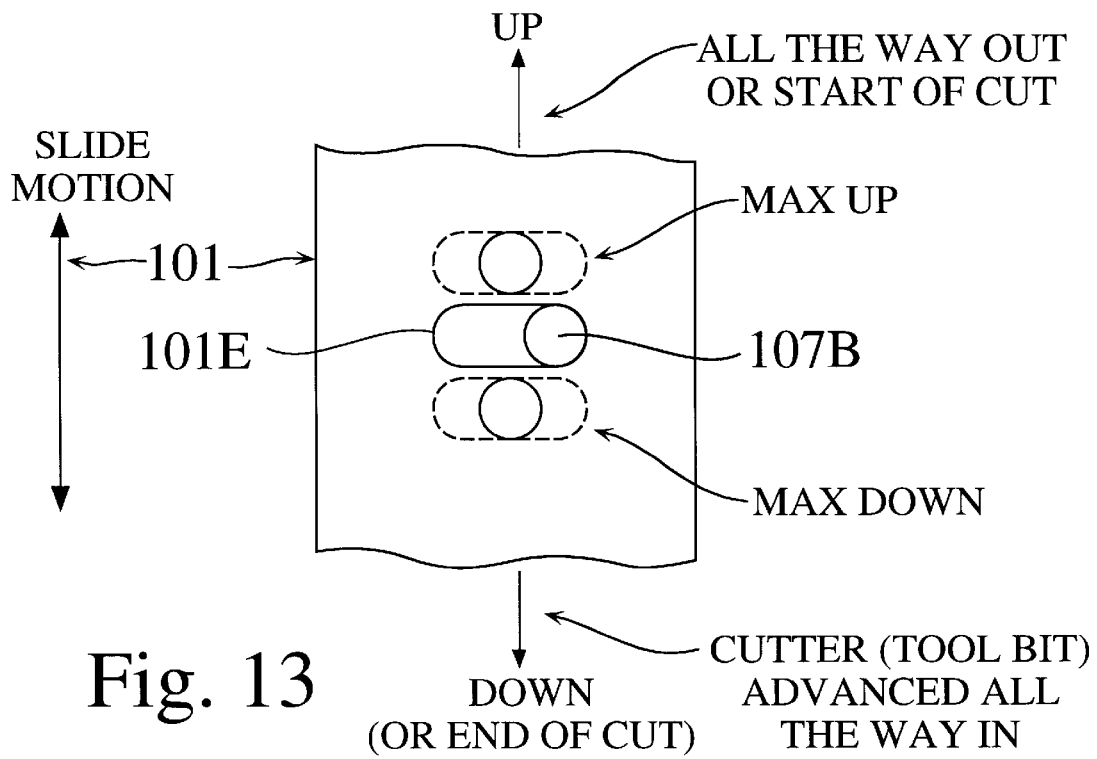

FIG. 13 depicts the cam roller and its varying positions in the cam roller slot.

Figure 14:
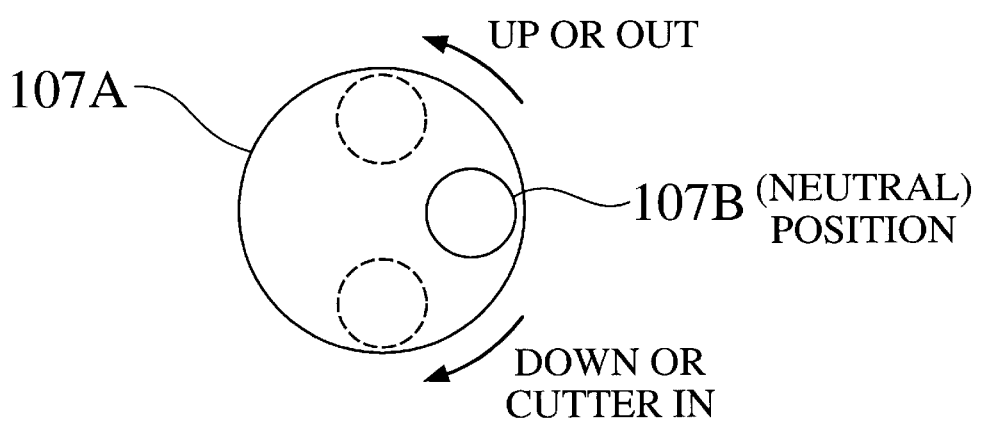

FIG. 14 is a view of the central portion of the shaft.

Figure 15:
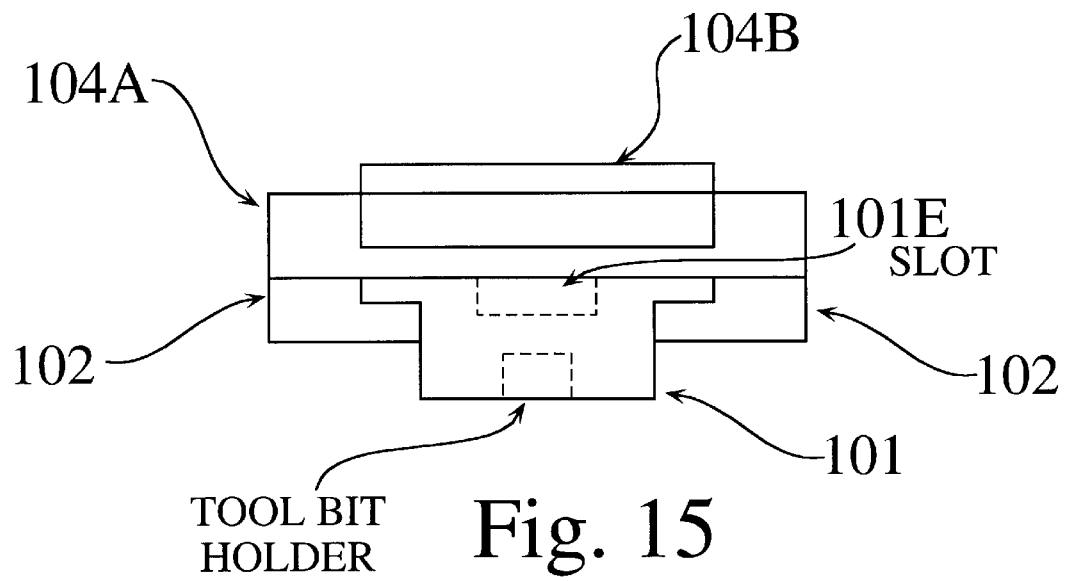

FIG. 15 is an overhead, cross-sectional view of the tool bit holder and the cam roller.

Figure 16:
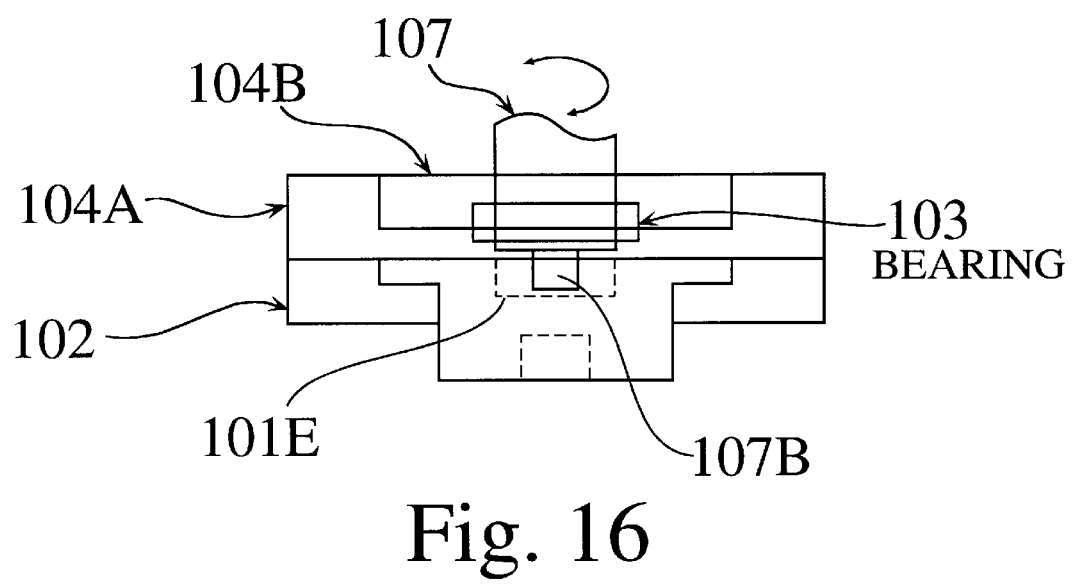

FIG. 16 provides another view of the tool bit holder and the cam roller.

Figure 17A:
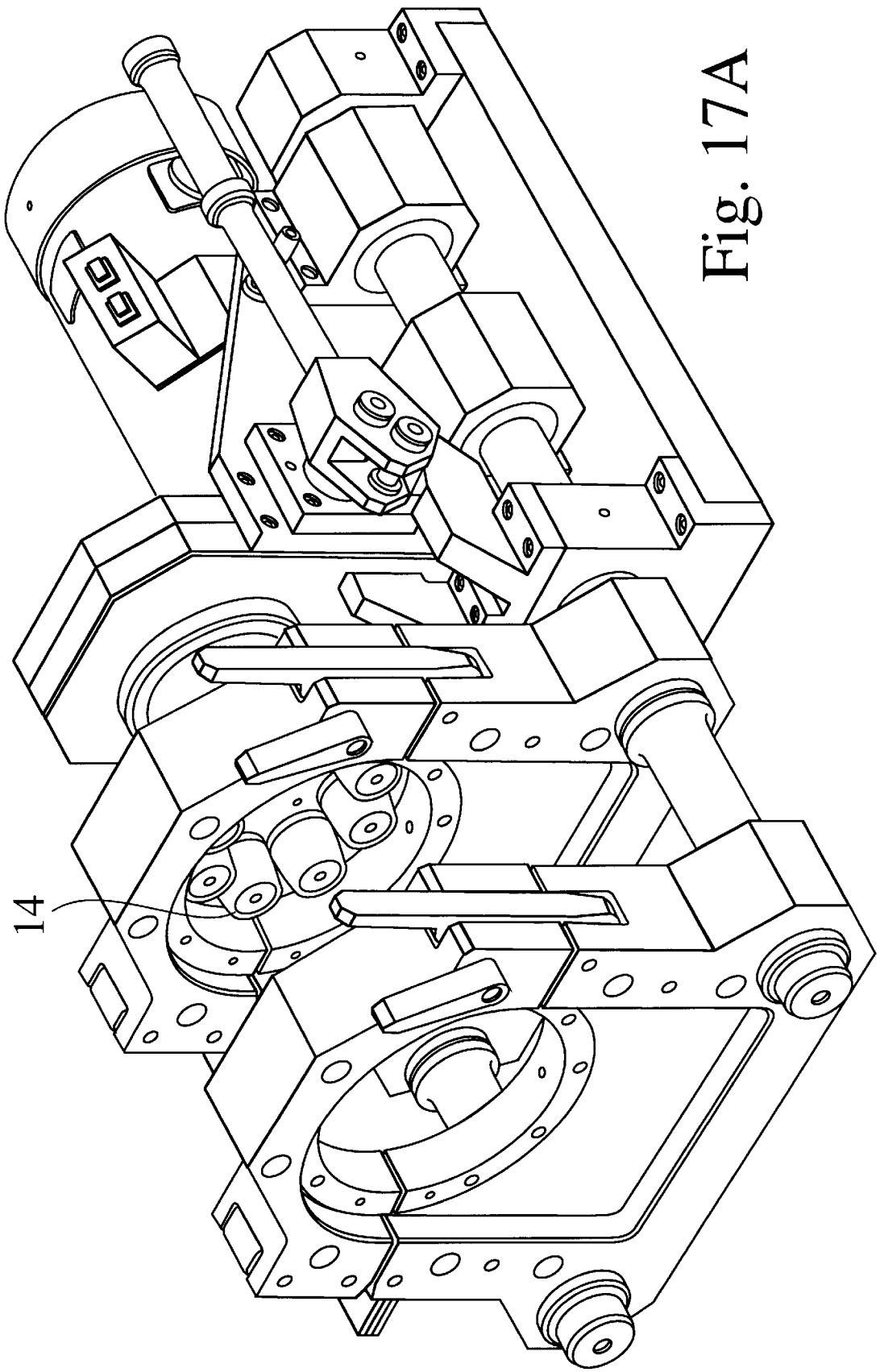

FIG. 17A is a view of an alternative embodiment of the invention, a Sizing Tool.

Figure 17B:
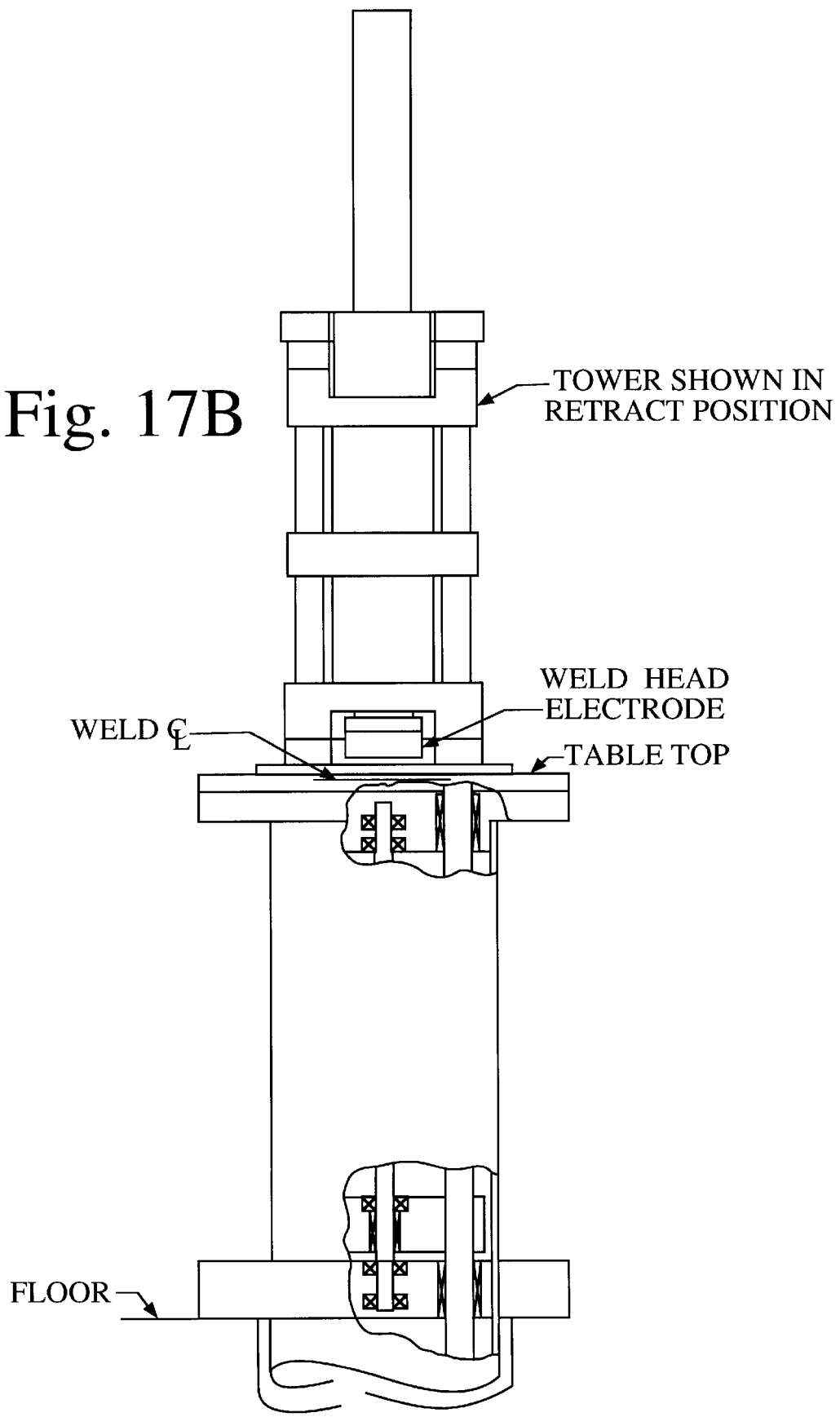

FIG. 17B is a view of an alternative embodiment of the invention, a Welding Tower.

Figure 18:
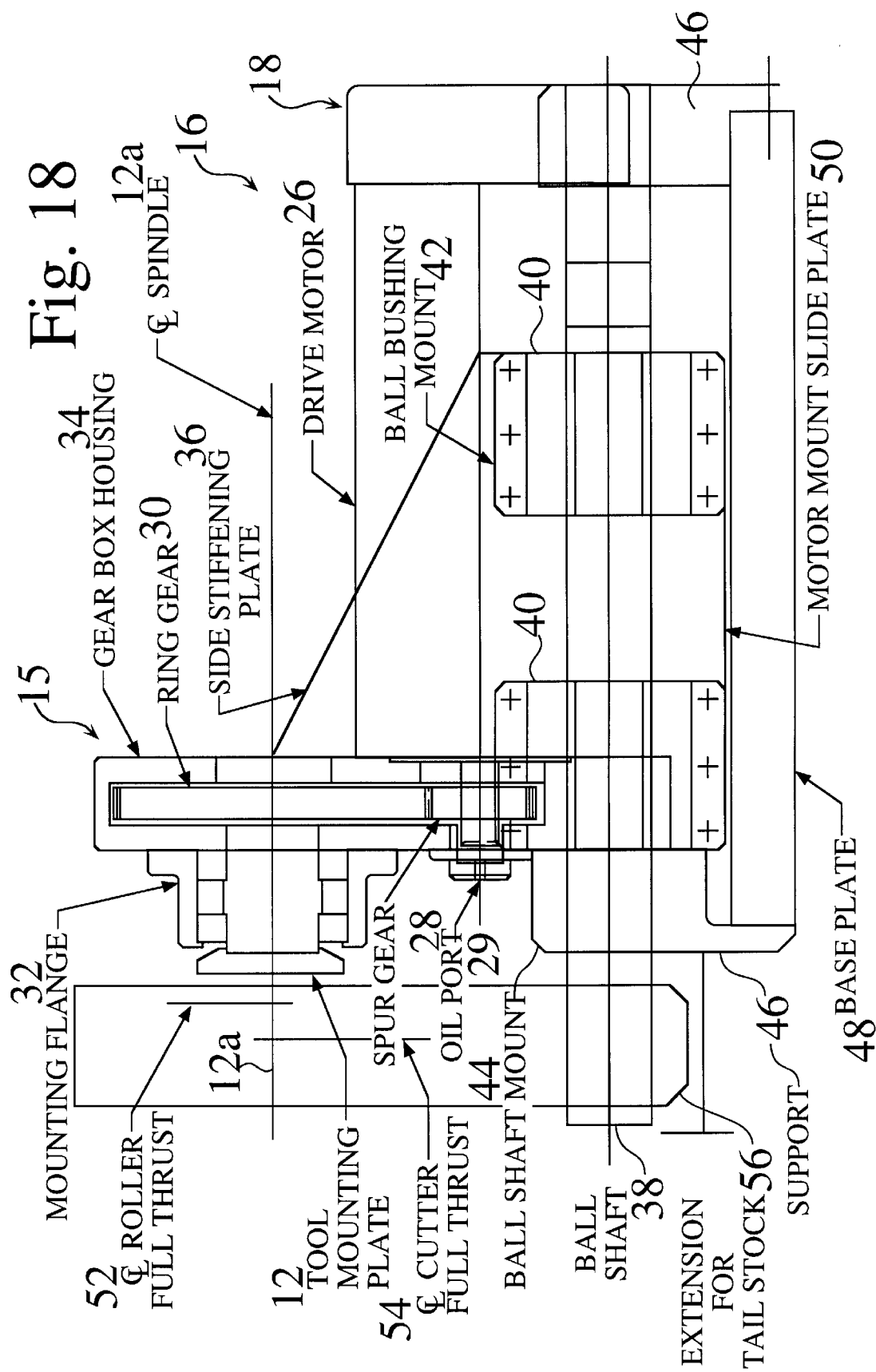

FIG. 18 is a cross-sectional view of the tool mount assembly installed on a motor assembly.

FIG. 19 is a front cross-sectional view of the assembly shown in FIG. 18.

FIG. 20 provides a front view of a workpiece frame.

FIG. 21 provides a side view of a workpiece frame.

FIG. 22 is a view of a Cutting Tool advance mechanism.

FIG. 23 is a view of a Cutting Tool advance mechanism.

FIG. 24 is a view of a Cutting Tool advance mechanism.

Figure 25:
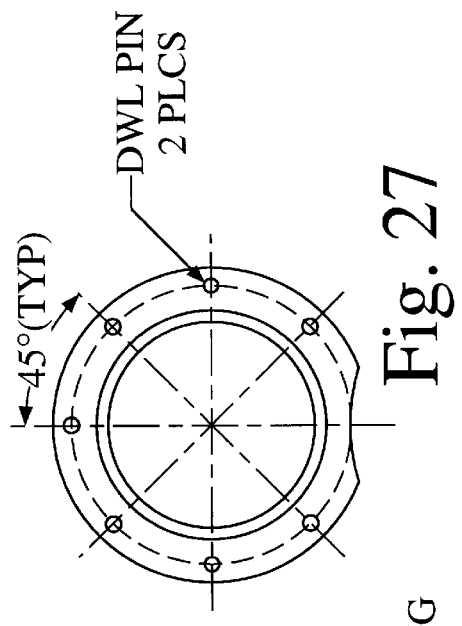

FIG. 25 is a sectional view of the Cutting Tool housing.

Figure 26:
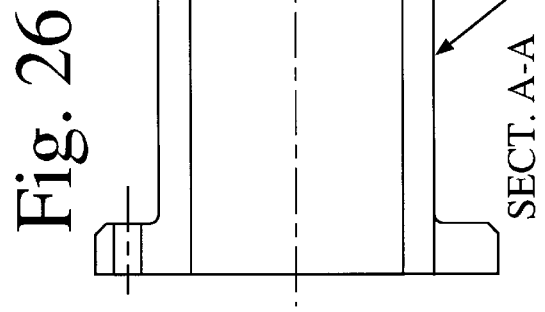

FIG. 26 is a sectional view of the Cutting Tool housing.

Figure 27:
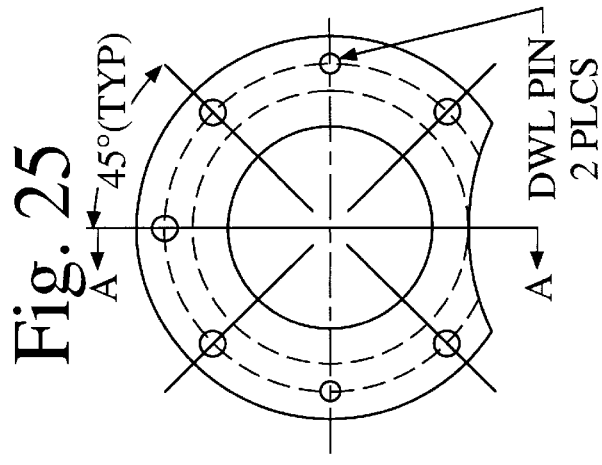

FIG. 27 is a sectional view of the Cutting Tool housing.

Figure 28:
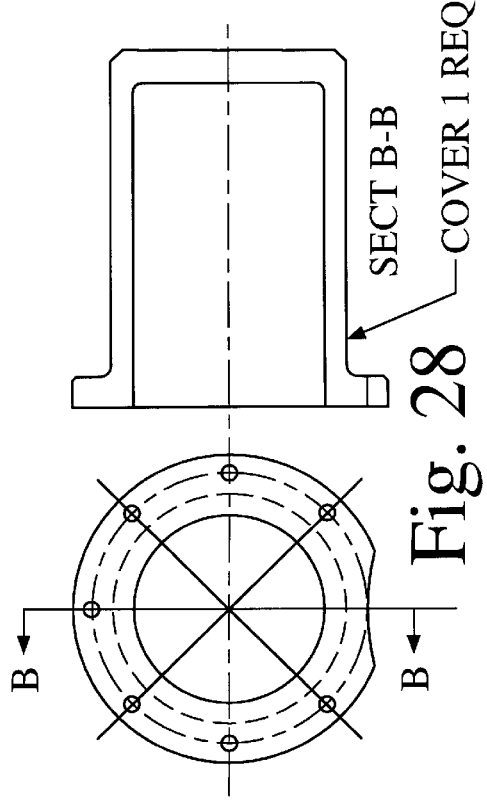

FIG. 28 is a sectional view of the Cutting Tool housing.

Figure 29:
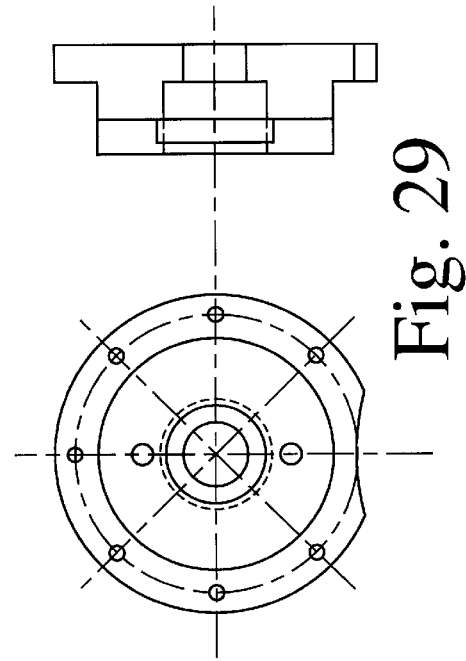

FIG. 29 is a sectional view of the Cutting Tool housing.

FIG. 30 is a view of components within the Cutting Tool including a housing cam pin guide, a cam housing, a clamp, a lead screw, a nut holder, a lead screw nut, a bearing support and a retainer.

FIG. 31 offers another view of components within the Cutting Tool housing.

FIG. 32 offers another view of components within the Cutting Tool housing.

FIG. 33 offers another view of components within the Cutting Tool housing.

FIG. 34 offers another view of components within the Cutting Tool housing.

FIG. 35 offers another view of components within the Cutting Tool housing.

FIG. 36 offers another view of components within the Cutting Tool housing.

FIG. 37 offers another view of components within the Cutting Tool housing.

FIG. 38 offers another view of components within the Cutting Tool housing.

FIG. 39 offers another view of components within the Cutting Tool housing.

FIG. 40 offers another view of components within the Cutting Tool housing.

Figure 41:
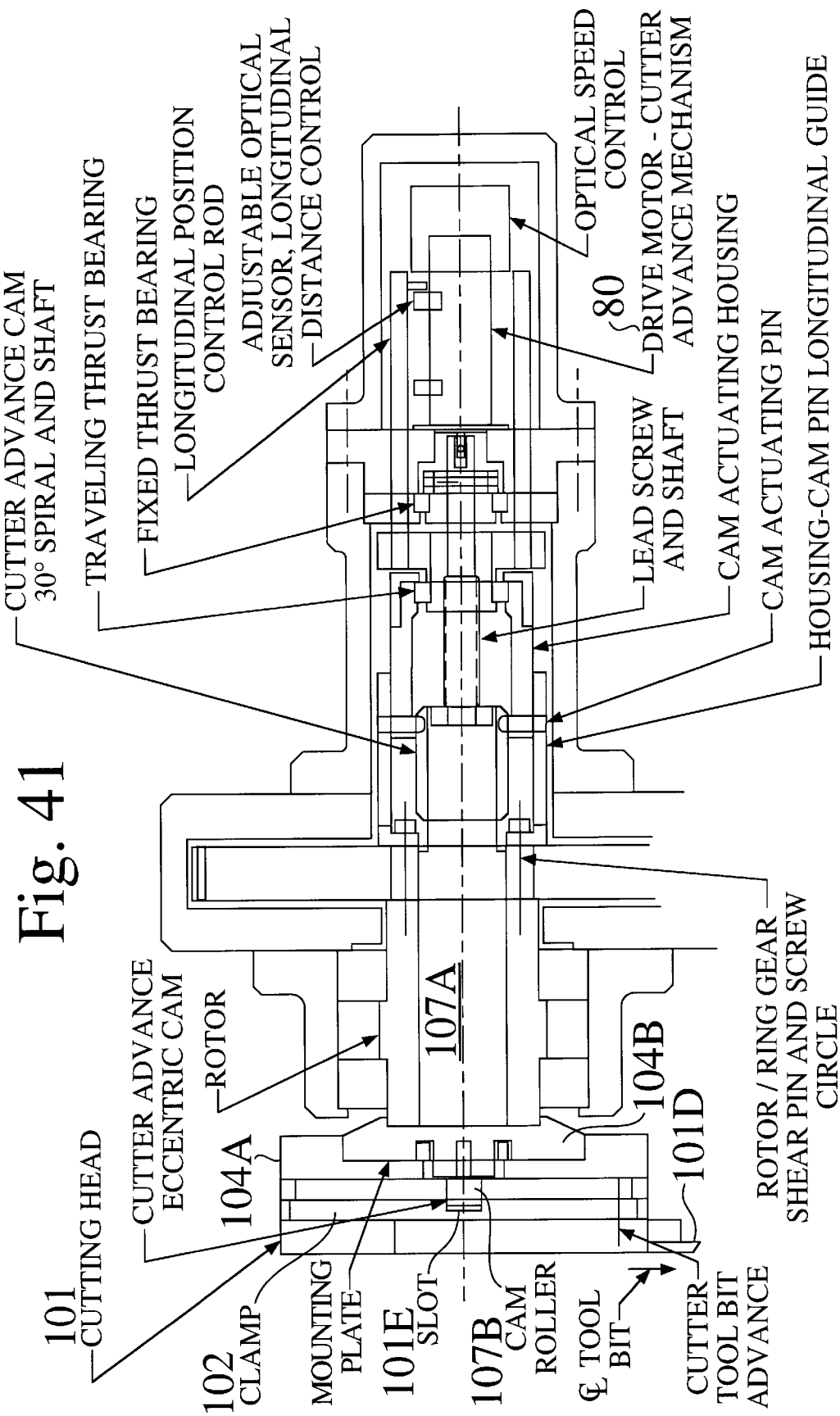

FIG. 41 is a cross-sectional view of a Tool Bit Advance Subassembly.

FIG. 42 is a view of a manually controlled cutter latch mechanism.

FIG. 43 is another view of a manually controlled cutter latch mechanism.

FIG. 44 is another view of a manually controlled cutter latch mechanism.

FIG. 45 is a view of an optical sensor and electrical clamp rotor. FIG. 45 shows a position control component.

FIG. 46 depicts an optical sensor.

FIG. 47 is a view of a rotor assembly within the position control component.

FIG. 48 is another view of a rotor assembly.

FIG. 49 is another view of a rotor assembly.

FIG. 50 is another view of a rotor assembly.

FIG. 51 depicts a forming means for making a contour on a workpiece, a drill.

FIG. 52 depicts a forming means for making a contour on a workpiece, an end mill.

FIG. 53 illustrates an internal boring tool.

FIG. 54 illustrates an internal boring tool.

FIG. 55 reveals an external cutting tool.

Figure 56:
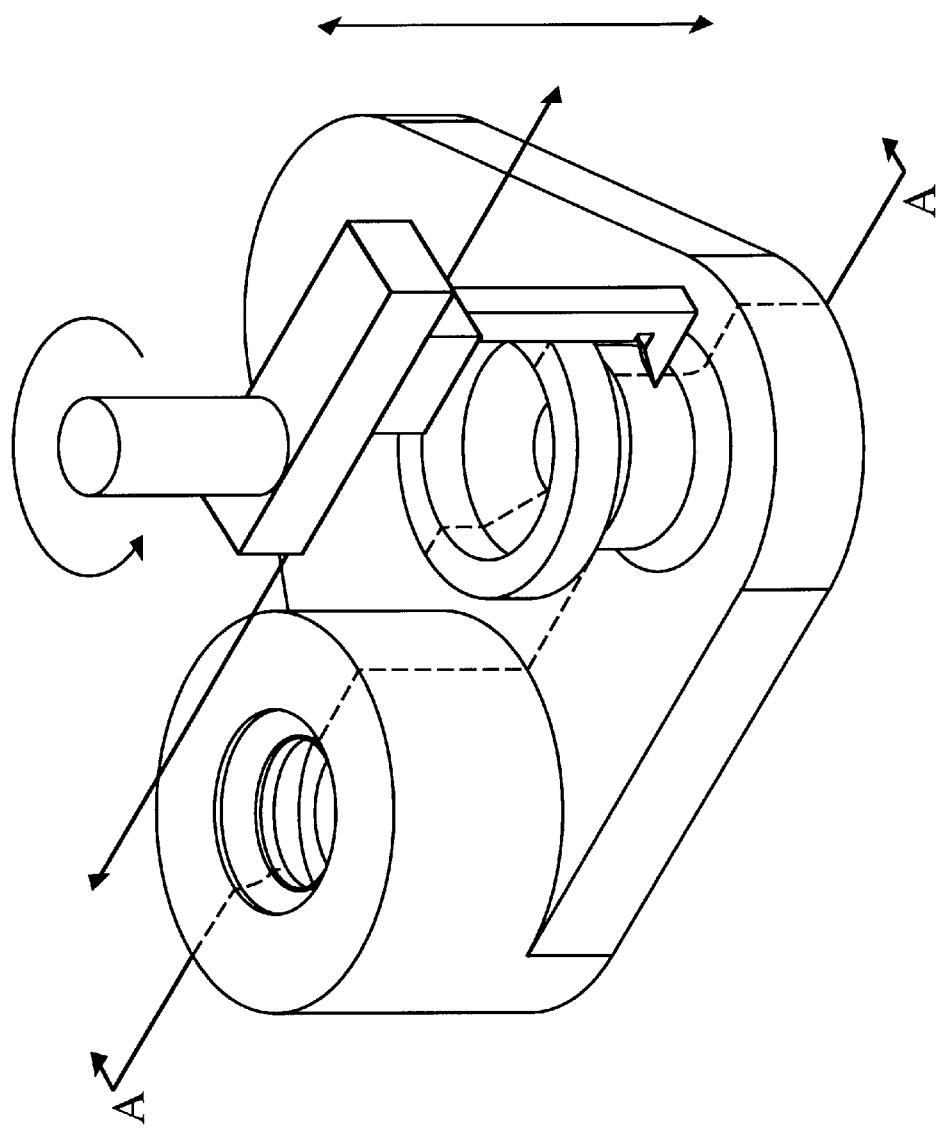

FIG. 56 is a perspective view of an external cutter.

Figure 57:
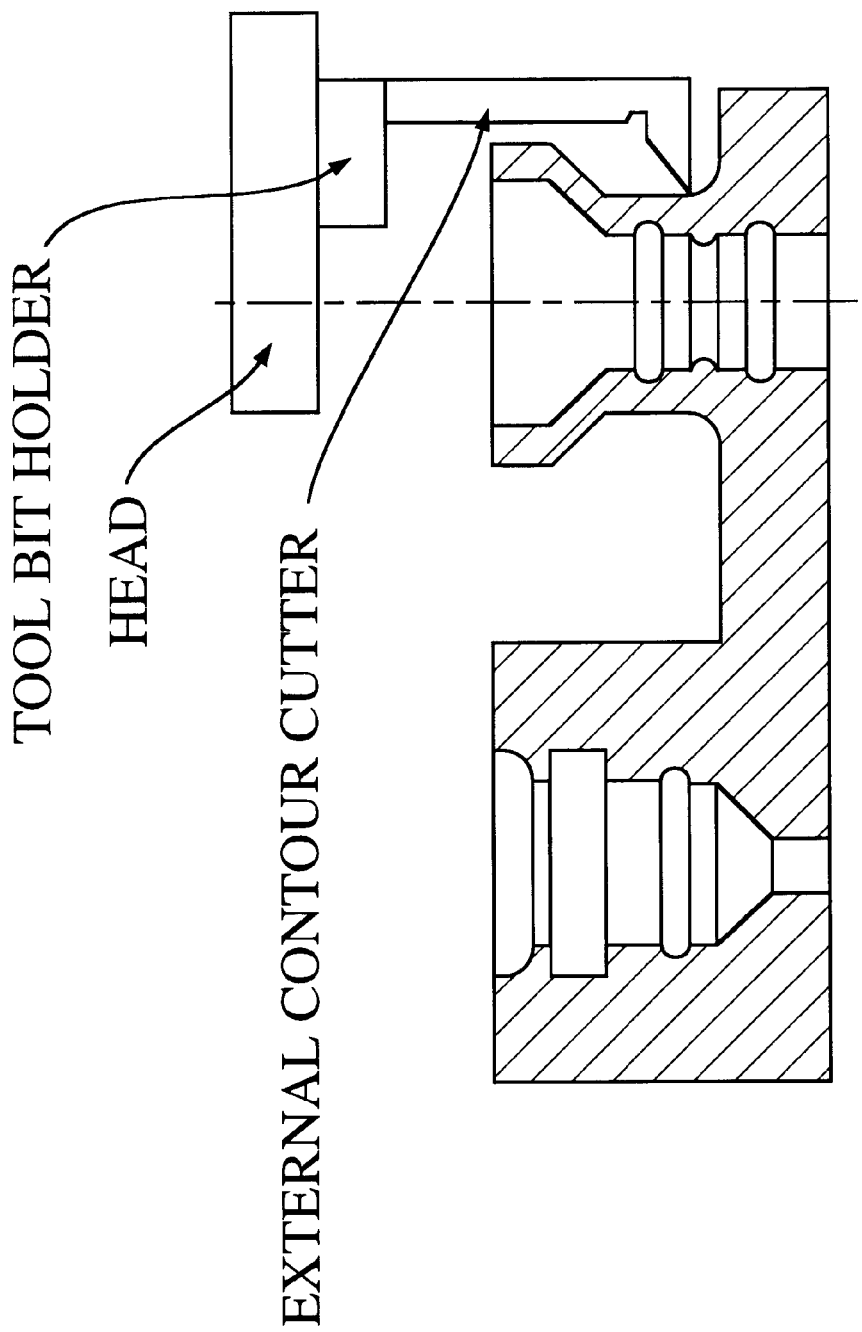

FIG. 57 is a sectional view taken along Section Line A—A of FIG. 56.

Figure 58:
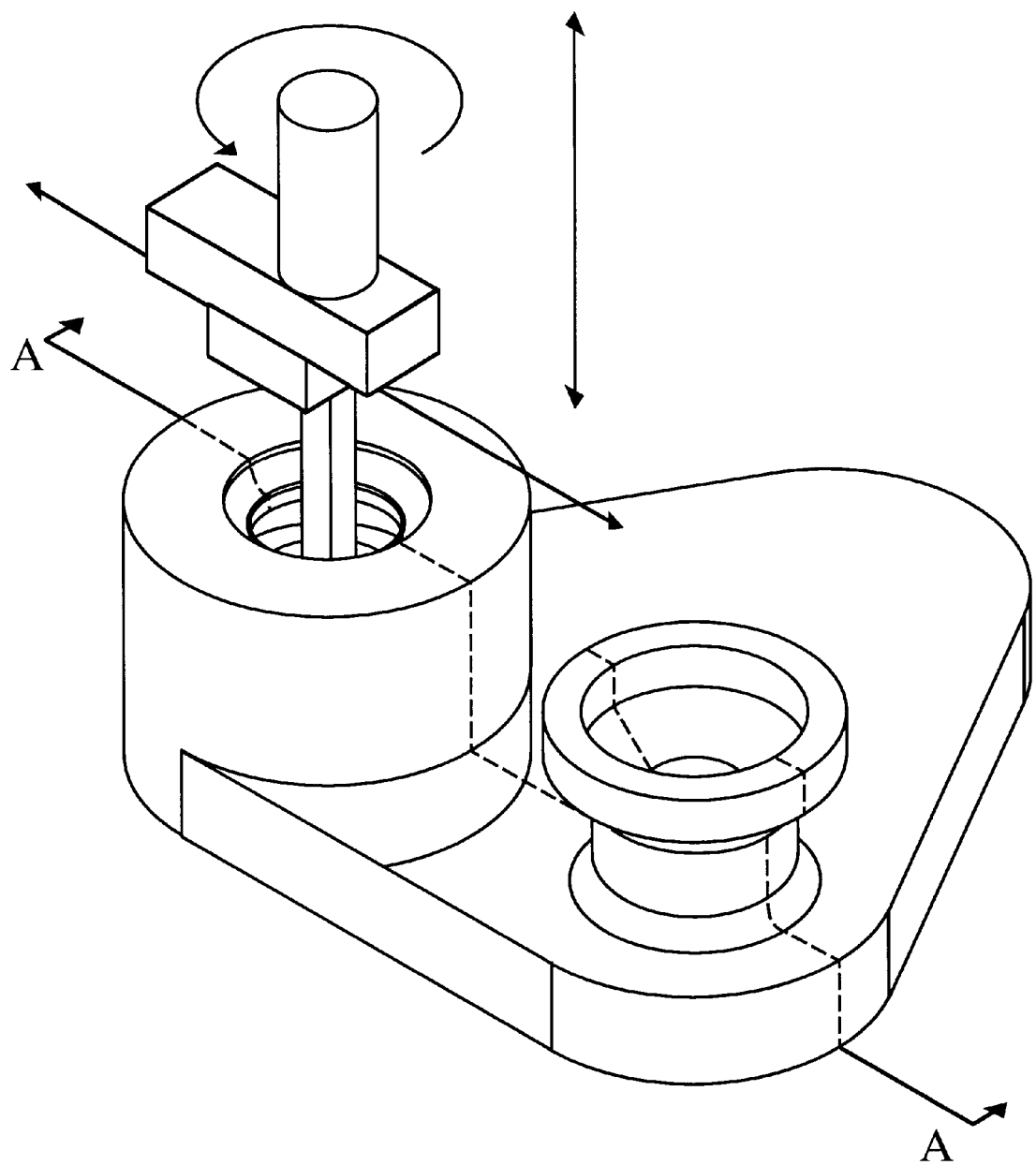

FIG. 58 is a perspective view of an internal cutter.

Figure 59:
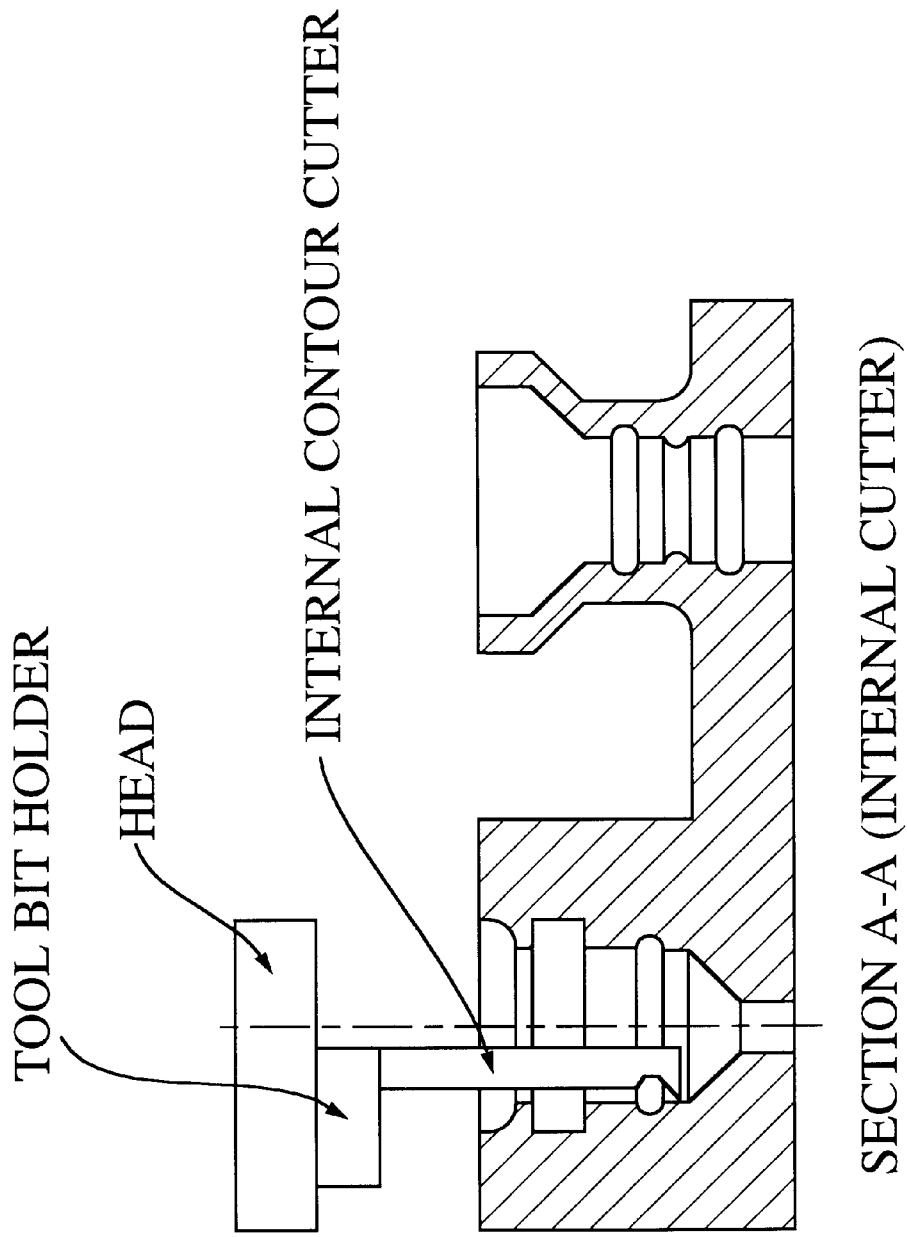

FIG. 59 is a sectional view taken along Section Line A—A of FIG. 58.

Figure 60:
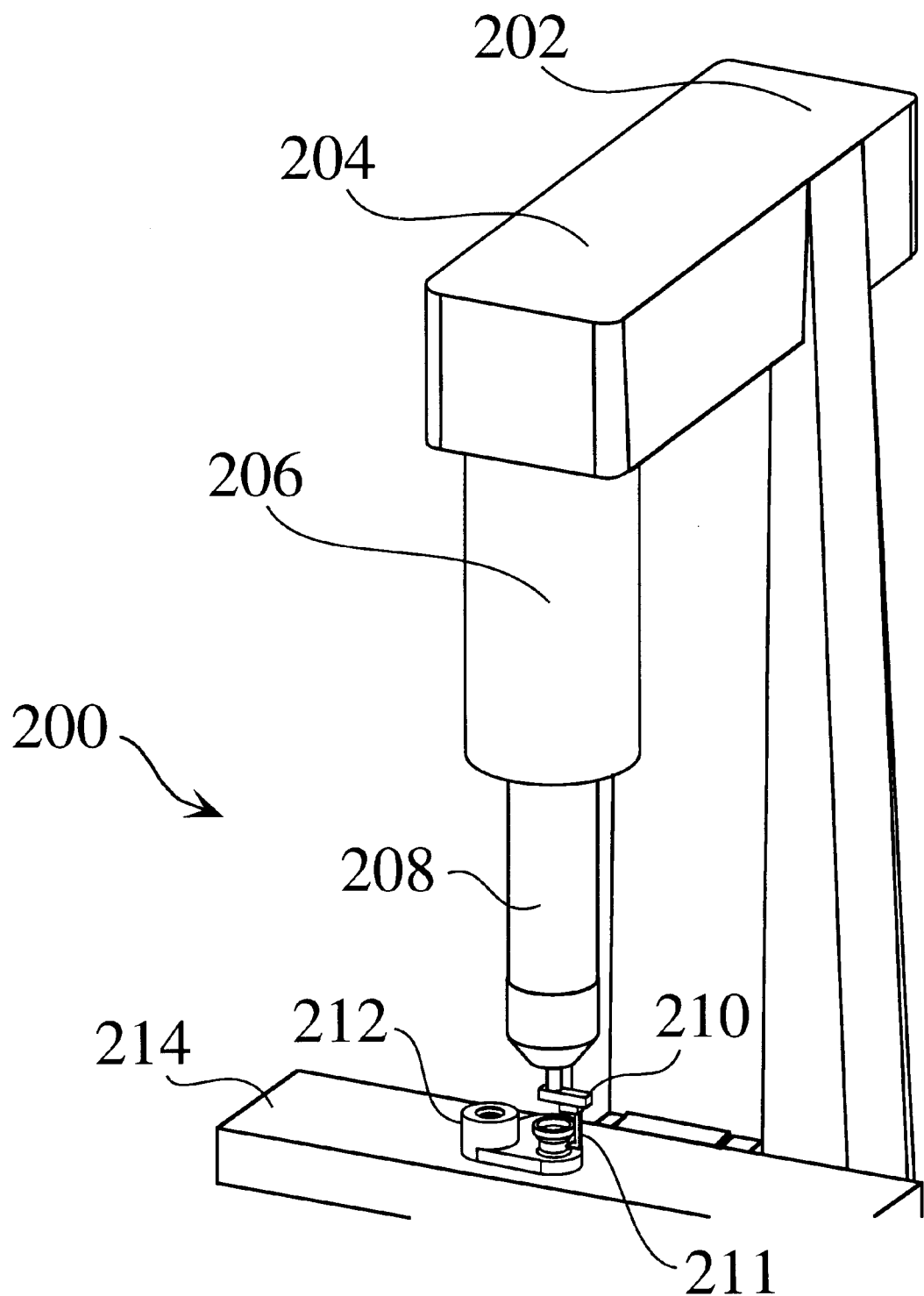

FIG. 60 is a perspective view of the one embodiment of the invention which reveals the locations of the three drive motors.

Figure 61:
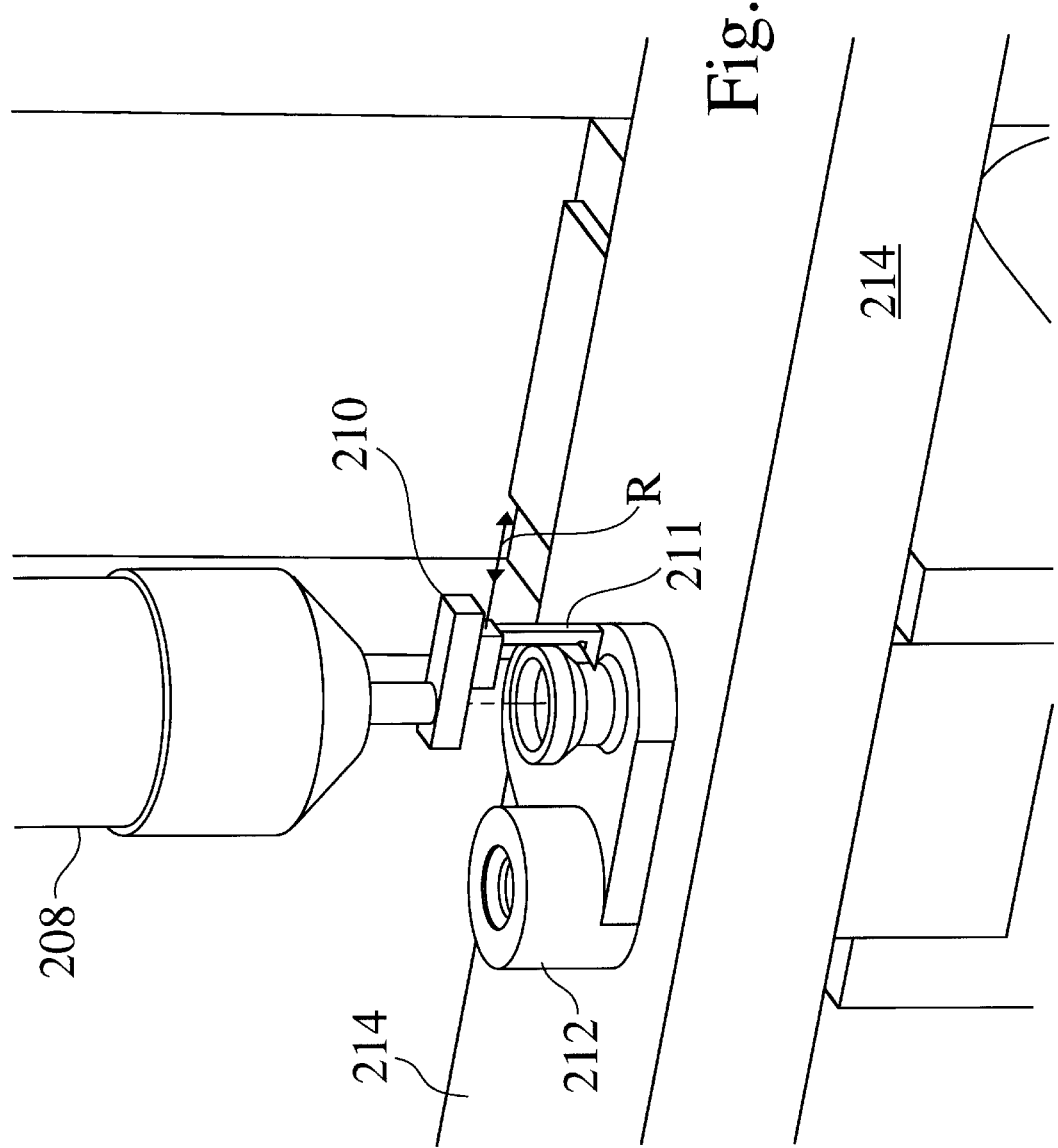

FIG. 61 is an enhanced illustration of a portion of the view provided in FIG. 60, and reveals the radial movement of the tool bit.

Figure 62:
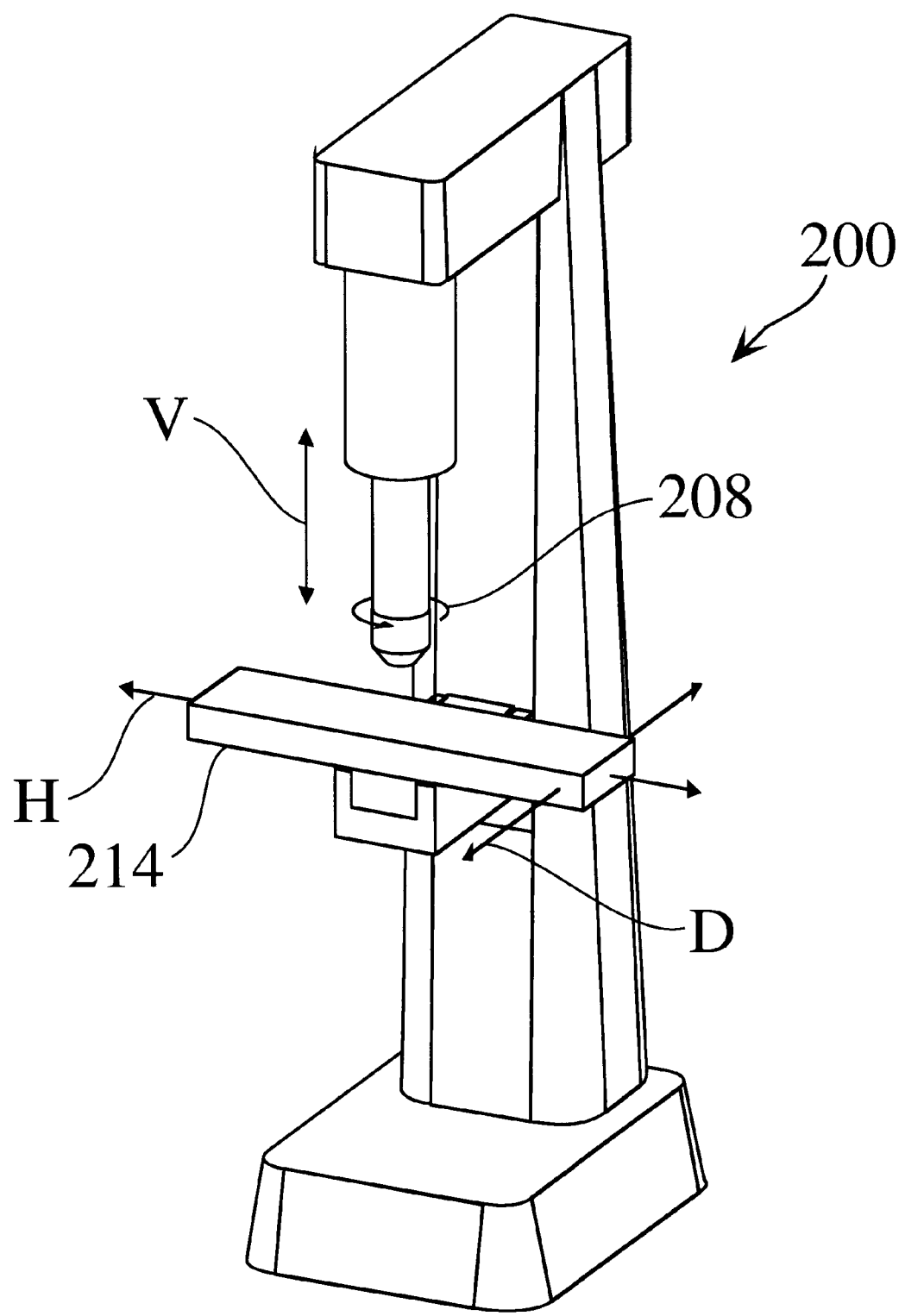

FIG. 62 is another perspective view of one embodiment of the invention which portrays the vertical and circular motions of the spindle and the two-dimensional motions of the clamp table.

Figure 63:
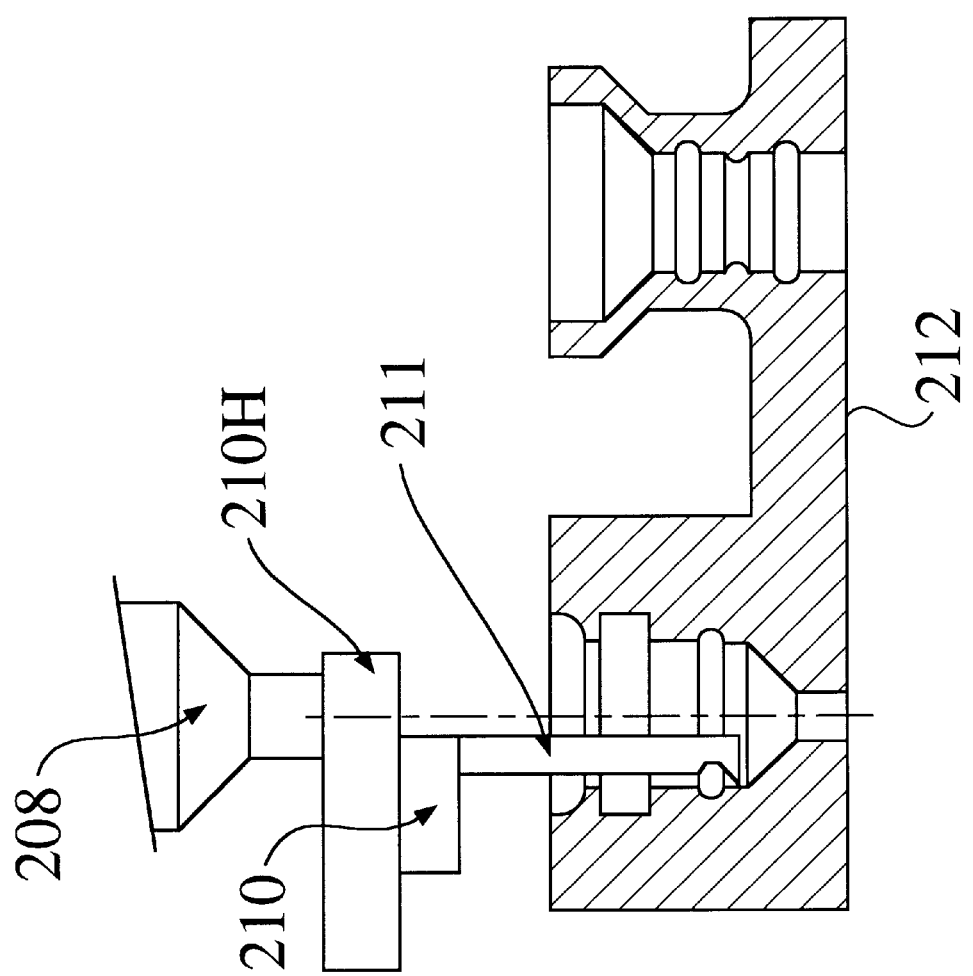

FIG. 63 supplies a cross-sectional view of a workpiece and the internal contours formed by the tool bit.

Figure 64:
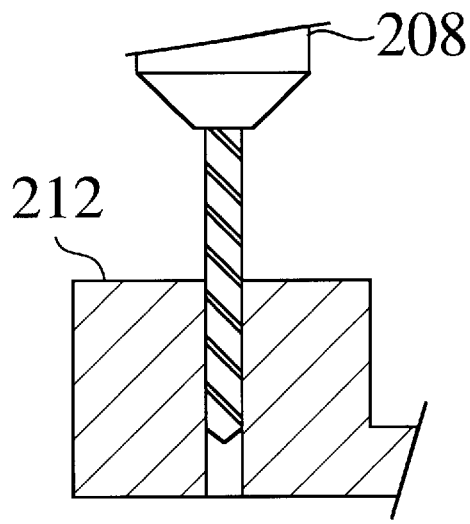

FIGS. 64 through 71 are successive cross-sectional views of a workpiece, showing several operations for forming internal contours. FIG. 64 shows one operation on a workpiece.

Figure 66:
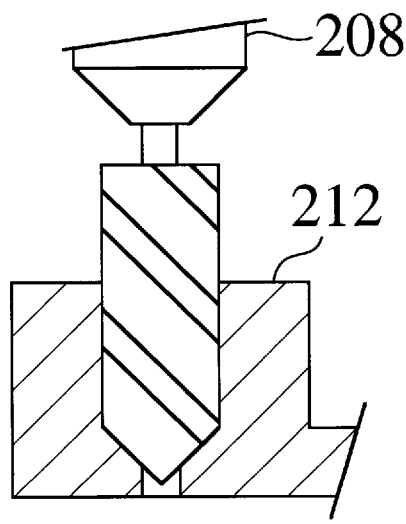

FIG. 66 shows another operation on a workpiece.

Figure 67:
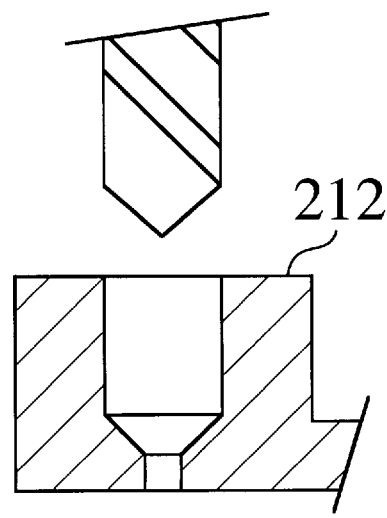

FIG. 67 shows another operation on a workpiece.

Figure 68:
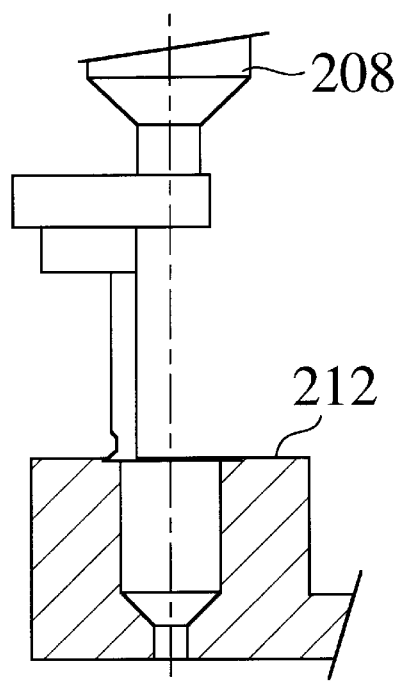

FIG. 68 shows another operation on a workpiece.

Figure 69:
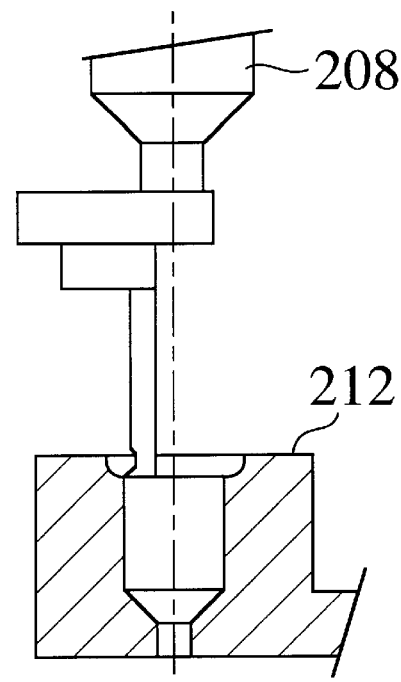

FIG. 69 shows another operation on a workpiece.

Figure 70:
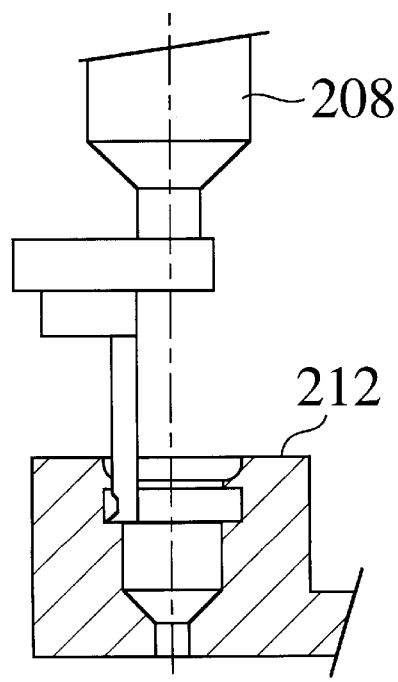

FIG. 70 shows another operation on a workpiece.

Figure 71:
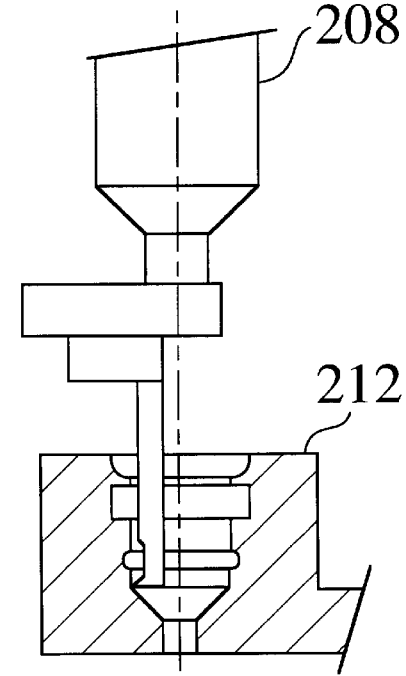

FIG. 71 shows another operation on a workpiece.

Figure 72:
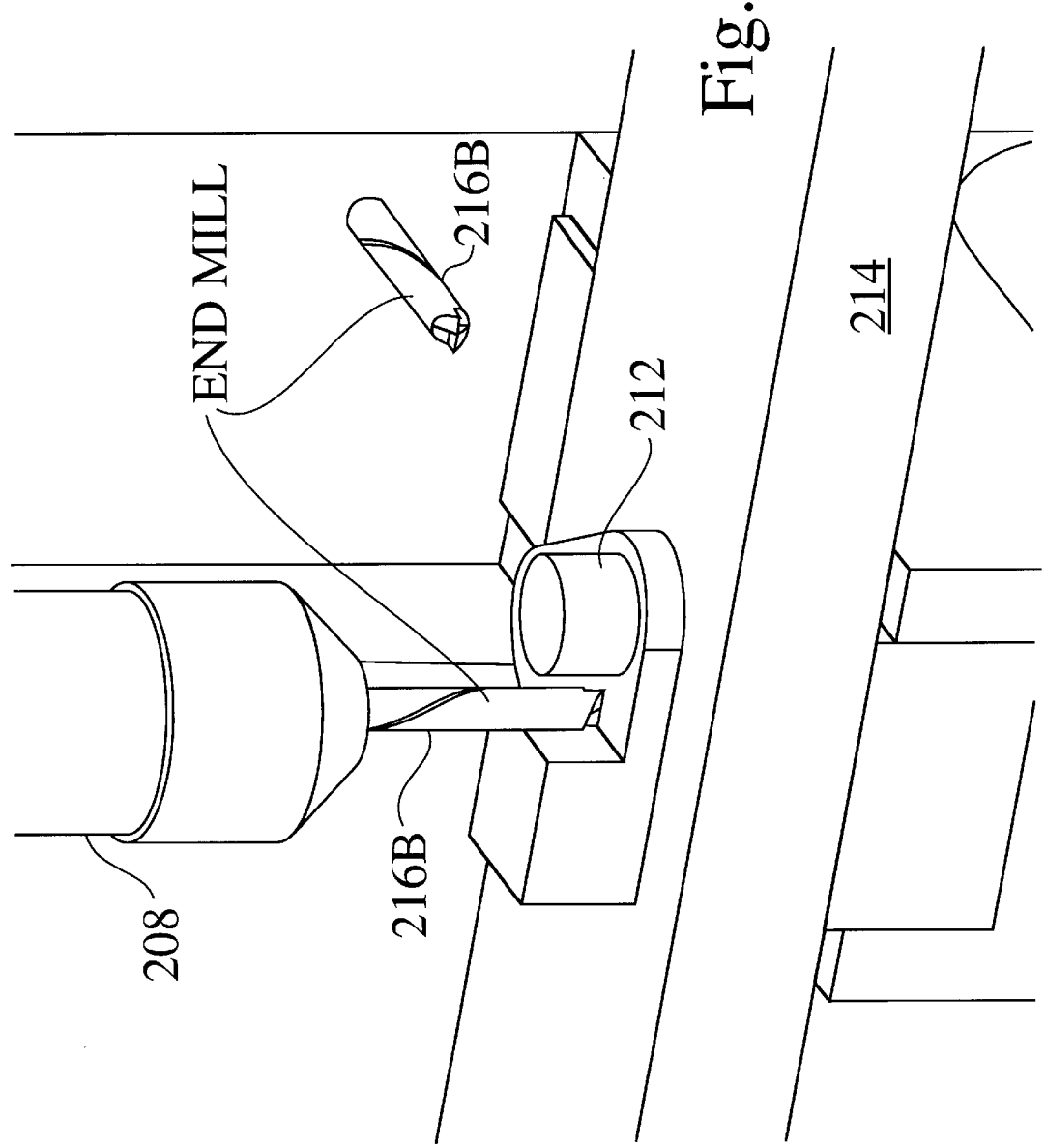

FIG. 72 is an enlarged view of an end mill mounted at the end of the spindle.

Figure 73:
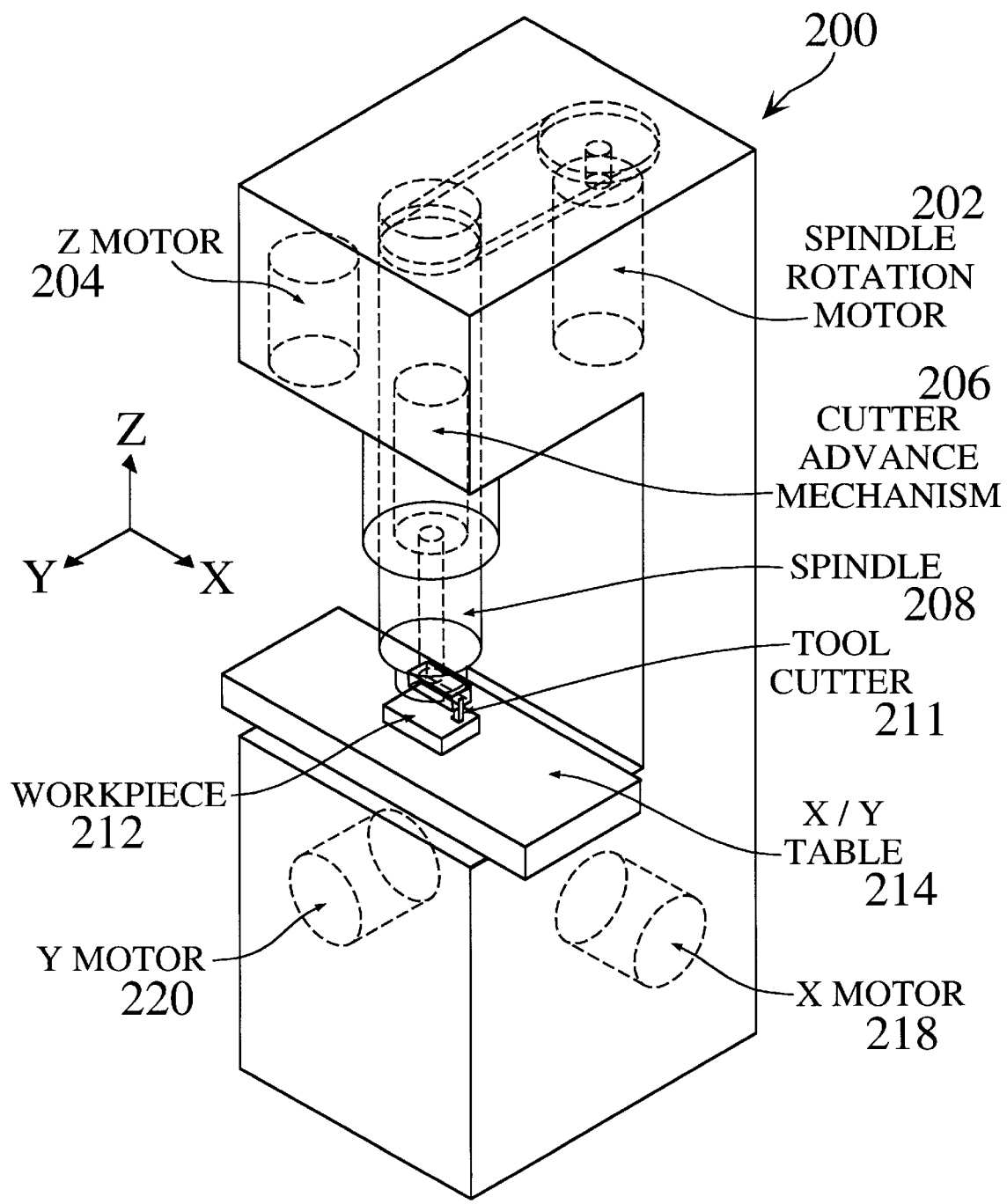

FIG. 73 is a schematic view of a preferred embodiment of a present embodiment of the present invention, which includes five independently controlled and operated motion means.

DETAILED DESCRIPTION OF PREFERRED & ALTERNATIVE EMBODIMENTS

Figure 1:
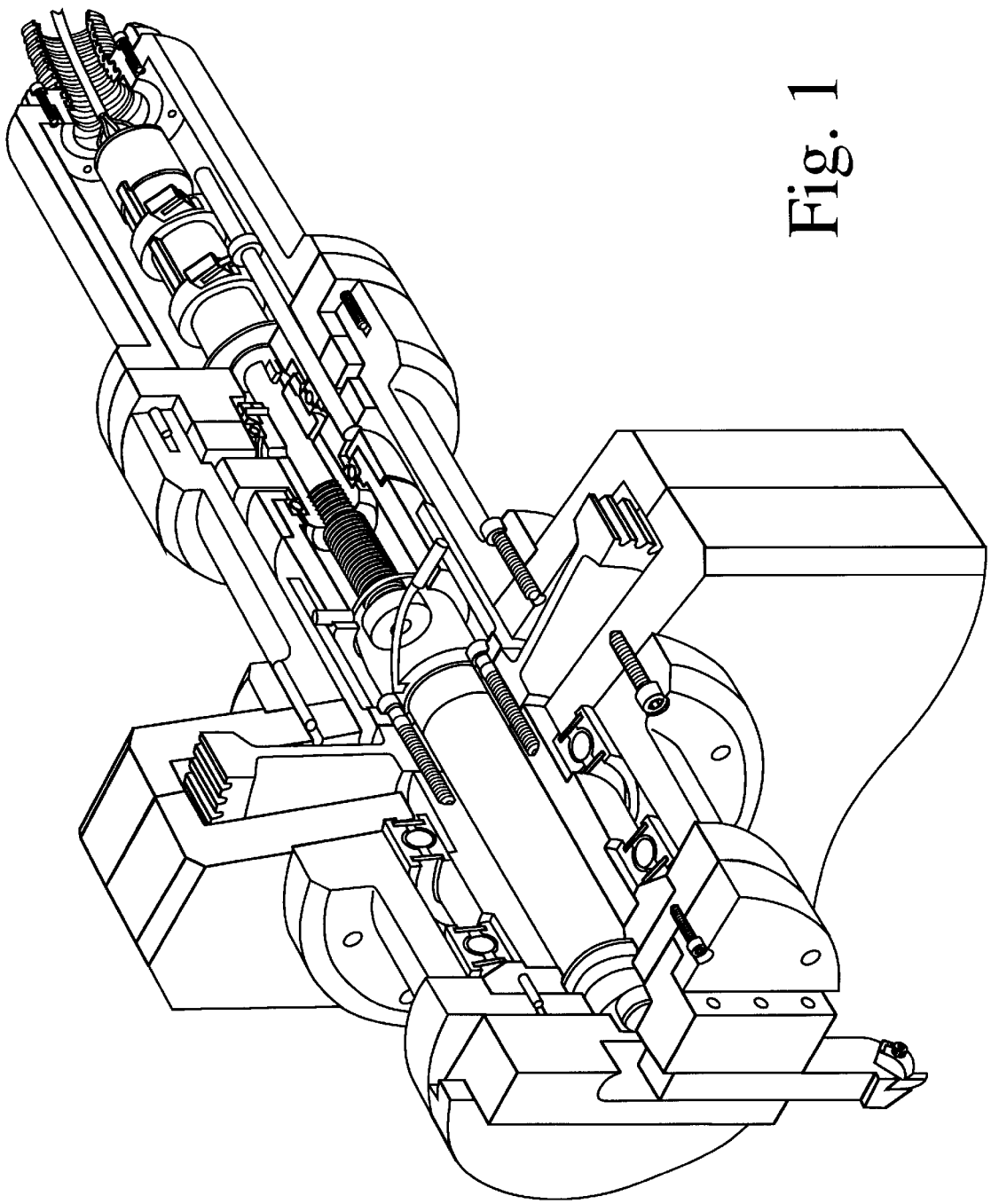
FIG. 1 is a cut-away perspective view of the preferred embodiment of the entire Cutting & Boring Tool and its associated drive system.
Figure 2:
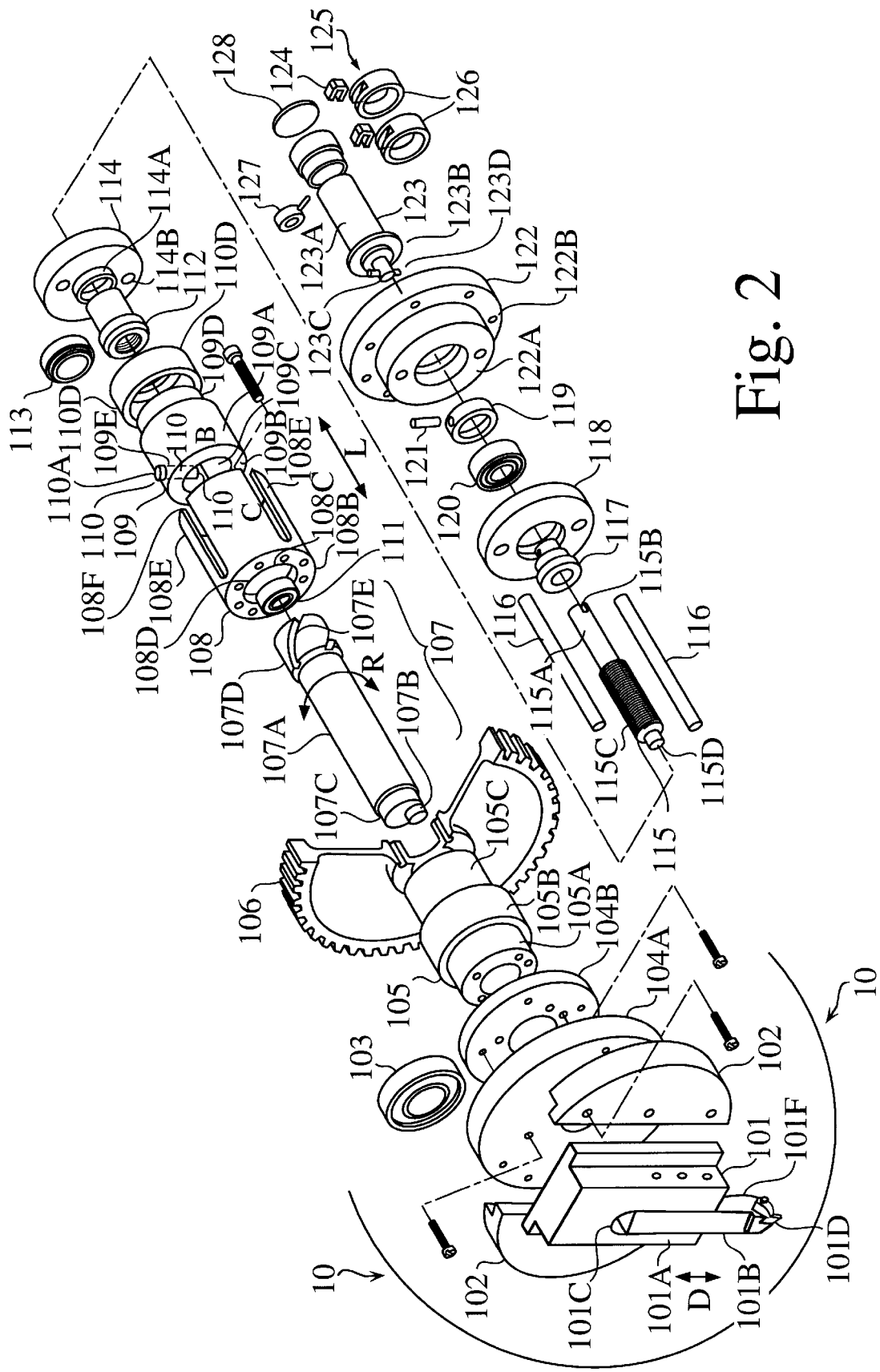
FIG. 2 is an exploded view of the interior components of the preferred embodiment of the Cutting & Boring Tool.

FIG. 1 is a perspective, cut-away view of the Cutting & Boring Tool. FIG. 2 reveals an exploded perspective view of a Cutting & Boring Tool Bit Drive Assembly 100. A tool bit holder subassembly 101 includes a body 101A and a bit holder 101B. The bit holder 101B is held into body 101A by screws, and holds tool bit 101D. A rear cam roller slot 101E is formed on the rear face of body 101A, and engages a roller 107B. This slot 101E must be aligned perpendicular to the direction of operation of the bit 101D. The entire tool bit holder subassembly 101 is held in place by a pair of tool bit holder clamp guides 102. Subassembly 101 slides back and forth in slotted guide provided by the clamp guides 102, and is guided and actuated by the engagement of cam roller 107B and horizontal slot 101E. The guides 102 are held by machine screws against a tool bit guide clamp mount 104A and a machine head mounting plate 104B. A bearing 103 is enclosed by clamp mount 104A and mounting plate 104B. The mounting plate 104B is coupled to a rotor 105, which includes a forward portion 105A, a step portion 105B, and a rear portion 105C. The rotor 105 is attached to the center of a rotor ring gear 106 that is driven by a smaller pinion gear (not shown in FIG. 2). The pinion gear, in turn, is powered by a main motor which provides rotary energy to the Cutting & Boring Tool. In an alternative embodiment, the ring gear 106 may be replaced by a belt or some other suitable traveling or rotating energy transfer device.

A transmission means which controls the motion of the Cutting & Boring Tool comprises a tool bit advance cam shaft 107, which rotates at the same speed as rotor ring gear 106. This shaft 107 has a central portion 107A and an eccentric cam roller 107B mounted on a forward-facing flange 107C. The opposite end of shaft 107 terminates in a spiral channel cup 107D. This cup 107D includes at least one spiral guidance channel 107E. The forward-facing flange 107C also engages bearing 103 at the front end. In one of the preferred embodiments of the invention, the spiral channels 107E are formed at an angle of approximately thirty degrees from the central axis of shaft 107. The shaft 107 is received by another critical transmission means in the Cutting & Boring Tool, a cam pin housing longitudinal guide cup 108. Cup 108 is attached to the rotor ring gear 106, and includes a cylindrical body portion 108, a front face 108B faces rotor ring gear 106, and a hole 108C that leads to a central chamber 108D. The end of the cup 108 which lies at the opposite end from the front face 108B includes at least one straight longitudinal guidance slot 108E. The slots 108E are formed at the rear end of the cup 108 which defines a rear opening 108F that receives a cam actuating housing 109. This housing 109 includes a body portion 109A, a front face 109B, a central chamber 109C, a rear flange 109D, and a cam pin hole 109E. A cam pin 110 is seated in cam pin hole 109E. The cam pin 110 has an upper portion 110A, a middle portion 110B that extends through housing 109, and a lower portion 110C that extends into the central chamber 109C enveloped by the housing 109. A rear fitting 110D fits over the flange portion 109D of housing 109. Bearing 111 engages the aft end of shaft 107 and the forward end of lead screw shaft 115D. A lead screw nut 112 and a traveling thrust bearing 113, that, in turn, are received by a control rod base 114 which includes a front flange 114A and a holes 114B. A lead screw shaft 115 fits through the rod base 114 and includes a rear portion 115A that has a slotted end 115B. The shaft 115 also includes a threaded portion 115C and a forward reduced portion 115D that engages bearing 111. A pair of longitudinal position control rods 116 are located parallel to shaft 115 and are received by holes in a ring bearing retainer 118 that is attached to a shaft bearing retainer 117. A bearing lock ring 119 is coupled to a fixed thrust bearing 120 pin 121. A motor mount 122 having a front face 122A and a flange portion 122B surrounds an advance mechanism drive motor shaft 123 that includes a motor body 123A, a front flange 123B, a forward projection 123C, and a pin 123D. The shaft 123 is coupled to an adjustable optical sensor 124 which provides longitudinal distance control. The motion of the shaft 123C is governed by an optical speed control 125 which includes an adjustable mounts 126, an actuator 127 coupled to control rod 116, and an encoder board 128.

The Cutting & Boring Tool is rotated by the action of the pinion gear, which engages ring gear 106. The advance cam shaft 107 provides the radial motion which provides precise control of the cutting action of the tool bit 101D. The cam roller assembly 107B passes through the center of the ring gear 106, cam roller 107B, rotor 105, mounting plate 104B, clamp mount 104A, and bearing 103 and is engaged by slot 101E. The circular movement of cam roller 107B at the end of shaft 107 forces the bit holder 101B to move in guides 102 and body 101A.

The advanced camshaft 107 rotates at the same speed as the ring gear 106. While the ring gear 106 is rotating at a given speed, shaft 107 advances or retards the speed of the shaft slightly as dictated by pin 110C. This slight increase or decrease in speed (forward or reverse motion) of cam shaft 107 actuates cam roller 107B in groove 101E. Pin 110C is forced forward and backward by lead screw 115 and drive motor 123.

After the Cutting & Boring Tool has been moved inside a hole in a workpiece, the in and out radial motion of the holder assembly 101B carries the bit 101D into the interior surface of the metal bore which is to be cut. The shaft 107, which moves the bit holder 101B, is rotated by the twisting motion of the spiral channel cup 107D. The spiral guidance channels 107E are designed to receive the lower portion 110C of cam pin 110, which is held by cam actuating housing 109. When housing 109 is moved forward, it slides forward but does not rotate, since cam pin 110 is constrained to move along a straight line of travel by longitudinal slot 108E in guide cup 108. Since the cam pin 110 can not rotate, the lower portion of the cam pin 110C that extends into spiral channel 107E forces shaft 107 to rotate. The spiral channels 107E act as a transmission which converts the back-and-forth translation motion of the housing 109 and the cam pin 110 that it holds into precise rotational motion that governs the radial action of the cam roller 107B.

Figure 3:
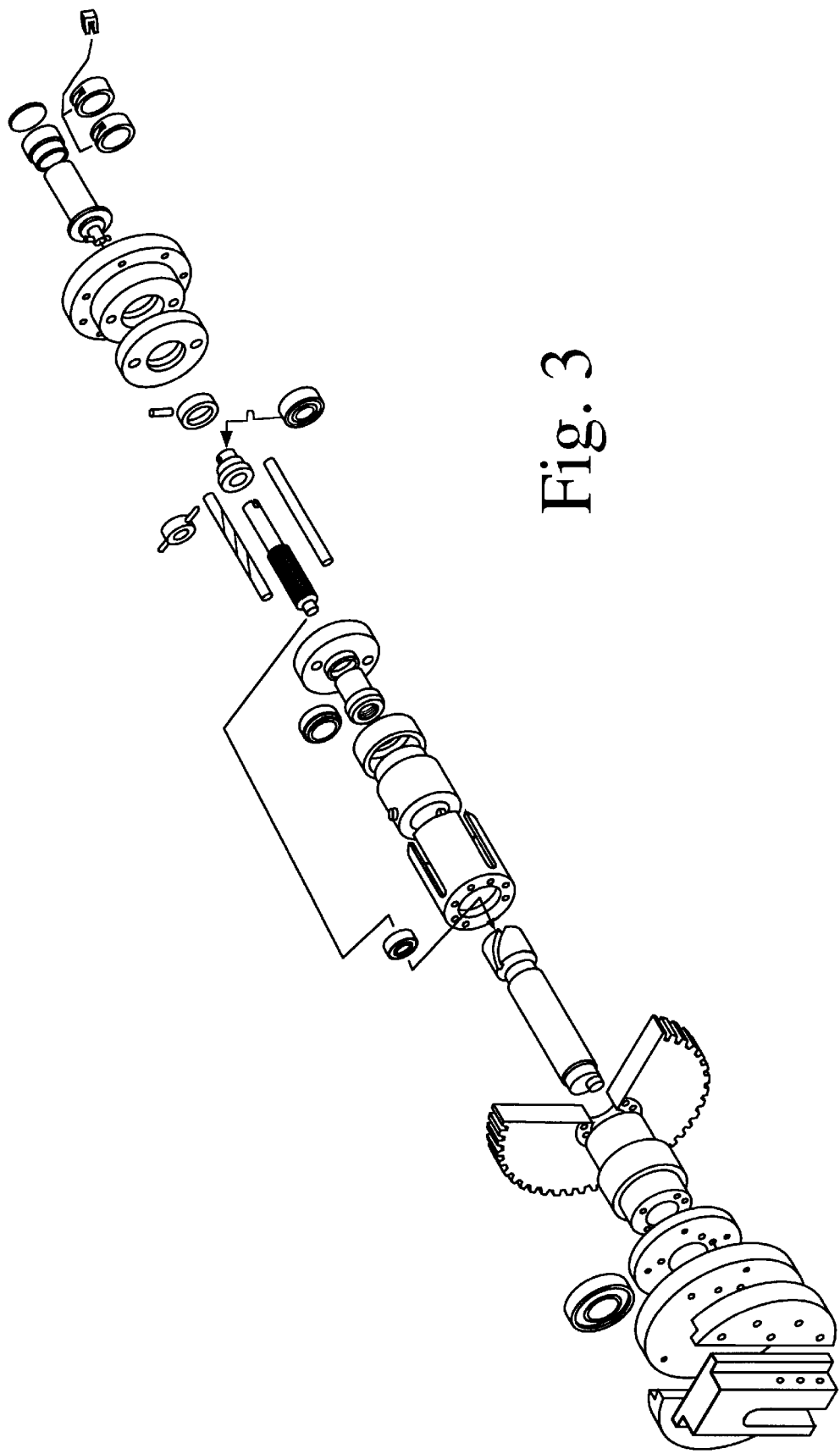
FIG. 3 is a second exploded view of the interior components of the preferred embodiment of the Cutting & Boring Tool.

FIG. 3 is a second exploded view of the interior components of a preferred embodiment of the Cutting & Boring Tool.

FIG. 4 supplies a perspective view of the front side of a body 101A, which is part of the tool bit drive assembly 100. FIG. 5 shows the tool bit holder 101B and a tool bit 101D that slides up into the body 101A depicted in FIG. 4. FIG. 6 exhibits the back side of the body 101A shown in FIG. 4. FIG. 6 reveals the horizontal slot 101E.

FIG. 7 is a perspective view of a tool bit advance cam shaft 107, which includes a central portion 107A and an eccentric cam roller 107B mounted on a forward-facing flange 107C. FIG. 8 shows three different views of the front end of the shaft 107, exhibiting the neutral, maximum down and maximum up positions.

FIG. 9 is another view of the back side of the body 101A, while FIG. 10 is an enlarged view of the cam roller slot 107E formed in the rear side of the body 101A. This slot 107E must be aligned in a direction that is horizontal to the direction of travel of the tool bit 101D. FIGS. 11 and 12 are paired views of the front end of the cam roller and views of the cam roller in the same position while engaged in the cam roller slot 101E formed in the tool bit slide block. FIGS. 13 and 14 depict multiple views of the cam roller 107B and its varying positions in the cam roller slot 107E. FIGS. 15 and 16 are overhead, cross-sectional views of the toll bit holder 101D and the cam roller 107E.

The Cutting & Boring Tool may be used to cut metals, plastics, composites and other materials. Cuts may be made from the inside of a tubular work piece toward the outside, or from the outside into tubular a work piece. The Cutting & Boring Tool utilizes an actuator 127 and an optical sensor 124 to control the longitudinal motion of the tool bit. The actuator 127 is fixed on one end of the control rod 116. The optical sensor 124 is electrically connected to the cutter advance drive motor 80. The actuator 127 is disposed to move past and to trigger the optical sensor 124 when the control rod 116 moves a predetermined distance.

The control rod 116 and the control rod base 114 regulate the transverse action that moves the single cutter tool bit 101D in and out of the center of the hollow tube 10 that is to be cut using the invention. As best seen in FIG. 17A, the control rods 116 are located parallel to a lead screw shaft 115. The control rods 116 are received by holes in a ring bearing retainer 118 that is attached to a shaft bearing retainer 117. The end of the rods 116 that is opposite the single cutter tool bit 101D fit into actuators 127. The pins on the actuators 127 engage optical sensors 124. When the single cutter tool bit 101D reaches a predetermined location within the hollow tube, the actuators 127 located on the control rods 116 cause the optical sensors 124 to terminate the action of the motor 80 that drives the transverse motion.

FIGS. 17A and 17B are illustrations of alternative embodiments of the invention, a Cutter Tool and a Welding Tower.

FIG. 18 is a cross-sectional rendering of the motor assembly 16 which drives the tool mount assembly 15. A drive motor 26 turns a spur gear 28, which, in turn, drives a ring gear 30. A mounting flange 32 is enclosed within gear box housing 34 and side stiffening plate 36. Two ball shafts 38 on either side of the motor assembly 16 slide within ball bushings 40 that are supported by ball bushing mounts 42 and ball shaft mounts 44. The ball shafts 38 are enclosed by extensions 46. Ball shaft mounts 44 are attached to a base plate 48.

FIG. 18 shows the roller plate 12 in its full thrust position for the sizing operation, which is delineated by reference numeral 52. The full thrust position for the cutter tool operation is marked by reference numeral 54. A tail stock 56 is mounted on the ball shaft 38. The ball shaft 38 maintains concentricity with the tool spindle center-line (axis of revolution) 12a. The tail stock 56 holds the tube 10. Inserts 58 having various diameters (best seen in FIG. 19) can accommodate many different sizes of tubes 10.

FIG. 19 is a front cross-sectional view of the apparatus shown in FIG. 18. FIGS. 20 and 21 provide front and side views of a workpiece frame. The motor mount sliding plate 50 moves back and forth on ball bushing 40 and ball shaft 38. This motion permits the tool mount assembly 15 which includes the rollers 14 to move in and out of the workpiece 10. This motion is limited by adjustable stops, guides, and gauge blocks (not shown) which set the thrust positions for each tool and which provide precise positioning for sizing and cutting.

FIGS. 22 through 29 includes several views of a tool advance mechanism. FIG. 22 portrays a thrust pivot frame 70 that supports a thrust mechanism 72 which includes a pivot hook 74 and a handle 76. The various handle positions are marked by reference numerals 76a through 76e which indicate the corresponding operational condition of the thrust mechanism for each position:

TABLE ONE

| Handle Position | Thrust Mechanism Operation |
|---|---|
| 76a | Idle |
| 76b | Initial contact |
| 76c | Initial thrust |
| 76d | Half thrust |
| 76e | Full thrust |

FIGS. 30, 31, 32, 33, 34, 35, 36, 37, 38, 39 and 40 depict views of components within the Cutting & Boring Tool including a housing cam pin guide, a cam housing, a clamp, a lead screw, a nut holder, a lead screw nut, a bearing support and a retainer.

FIG. 41 is a cross-sectional view of a Tool Bit Advance Subassembly. FIG. 41 reveals the location of the cutter advance drive motor 80. FIGS. 42, 43 and 44 provide various views of a cutter tool latch mechanism, showing a ball shaft, a ball bushing mount, a ball bushing, a latch, a latch frame, a latch handle and an eccentric latch actuator.

FIGS. 45 through 50 exhibits a series of views of an optical sensor and electrical clamp rotor. FIG. 45 shows a position control component. FIG. 46 depicts an optical sensor. FIGS. 47, 48, 49 and 50 portray various views of a rotor assembly within the position control component.

FIGS. 51 and 52 depict two examples of forming means for making a contour in or on a workpiece, a drill and an end mill. These entry tools are used when the Mill is locked in its neutral position. When the advance mechanism is locked in the neutral position as shown by the position of the advance cam shaft 107 in FIG. 8 and FIG. 10, the Mill may be used like a conventional drill press. FIGS. 53 and 54 illustrate internal boring tools. FIG. 55 reveals an external cutting tool. FIG. 56 is a perspective view of an external cutter. FIG. 57 is a sectional view taken along Section Line A—A of FIG. 56. FIG. 58 is a perspective view of an internal cutter. FIG. 59 is a sectional view taken along Section Line A—A of FIG. 58.

FIG. 60 is a perspective view of a preferred embodiment of a Vertical Boring Mill 200 which contains the tool bit advance drive mechanism described above. The Mill 200 includes a spindle rotation motor 202, a Z-axis spindle motor 204 and a tool bit advance mechanism 206. The operation and control of each of these three systems 202, 204 & 206 are completely independent. A spindle 208 holds the tool bit holder 210, which holds the tool bit 211 that impinges upon a workpiece 212 held on an X–Y table 214. The spindle rotation motor 202 spins the spindle 208, while the Z-axis spindle motor 204 provides the vertical translation of the spindle 208. The tool bit advance mechanism 206 provides the radial motion that changes the cutting radius. This radial motion R of the tool bit is best viewed in FIG. 61.

FIG. 62 is another perspective view of the Mill 200, showing three axes of motion, X, Y and Z. The spindle 208 moves up and down along the vertical axis Z, while the bench 214 supplies movement from side to side along the horizontal axis X and from front to back along an axis Y.

Figure 65:
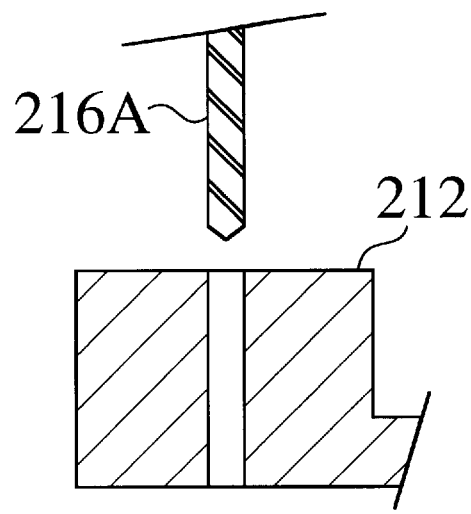

FIG. 63 is an enlarged, cross-sectional view of a workpiece 212 that reveals the variety of internal contour cuts formed by one particular example of a tool bit, a boring bar 211. FIGS. 64 through 71 supply a sequence of cross-sectional views of a workpiece 212. In FIG. 64, a hole is drilled through the workpiece 212. In FIG. 65, the spindle 208 if lifted and the drill bit 216A is withdrawn. FIGS. 66 and 67 portray the formation of a countersink. In FIGS. 68 through 71, a cutting bit is moved both vertically along the Z-axis and radially R to form various internal contours.

FIG. 72 depicts an end mill 216B being used to form a contour on a workpiece 212.

FIG. 73 provides a schematic illustration of a preferred embodiment of the Boring Mill 200. The invention incorporates five separately controllable and independently operable drive mechanisms: a spindle rotation motor 202, a Z-axis spindle motor 204, a tool bit advance mechanism 206, an X-axis motor 218 and a Y-axis motor 220. The spindle rotation motor 206 rotates spindle 208 at a variable speed. In a preferred embodiment, this motor 206 is coupled to the spindle 208 using a belt. Any equivalent means of transferring rotational power to the spindle 208, such as gears, shafts or a rack and pinion would be satisfactory. In a preferred embodiment, the Z-axis spindle motor 204 utilizes a gearbox and a ball leadscrew to govern the vertical motion along the Z-axis of the spindle 208. Other alternative or equivalent means of controlling the excursions of the spindle 208 along the Z-axis may be employed. When the Z-axis spindle motor 204 translates the spindle 208 up or down, the both the spindle 208 and the advance mechanism 206 move together. In an alternative embodiment, the spindle 208 could remain stationary and the Z-axis motor 204 could move the bench 214 up or down. In one preferred embodiment of the invention, the advance mechanism 206 comprises the elements depicted in FIG. 2. In this embodiment, the housing covering the spindle 208 is made sufficiently large to contain the advance mechanism 206 that governs the radial motion of the tool bit 211. The advance mechanism 206 controls the radial motion of the tool bit 211. The X-axis and Y-axis motors 218 & 220 supply motion along the X and Y directions for the clamp table 214.

When the advance mechanism 206 is in its neutral position, the Mill 200 may be used like a conventional drill press, using a forming means for making a contour (216A, 216B) which is held in its central position and spins directly on center without any radial excursion. The forming means may include any cutting or piercing tool, such as drill 216A or an end mill 216B. When the advance mechanism 206 is activated manually or using a CNC System, a wide variety of internal and external contours may be formed on a workpiece 212. Some machining operations require the use of a conventional drill bit 216A to form a hole in a workpiece 212 before the advance mechanism 206 is engaged. This step may be followed by a milling operation that is performed by an end mill 216B as shown in FIG. 72. The end mill 216B is typically used to make a boss or a flat. A tool bit 211 such as a boring bar may then be employed to produce contours like those depicted in FIGS. 68 through 71.

The present invention will revolutionize the machining industry by providing a compact and low-cost alternative to present conventional drill presses, lathes and milling machines. One operator can accomplish a wide variety of machining tasks on this single easy to use Mill without stopping to change-out tool bits or control mechanisms. The present invention is also eminently capable of being integrated in a CNC System which could automatically accomplish a broad range of complex and precise machining tasks.

CONCLUSION

Although the present invention has been described in detail with reference to a particular preferred embodiment, persons possessing ordinary skill in the art to which this invention pertains will appreciate that various modifications and enhancements may be made without departing from the spirit and scope of the Claims that follow. The various materials that have been disclosed above are intended to educate the reader about one preferred embodiment, and are not intended to constrain the limits of the invention or the scope of the Claims. Although the preferred embodiments have been described with particular emphasis on specific types of workpieces, the present invention may be beneficially implemented with other materials such as plastics or composites. The List of Reference Characters which follows is intended to provide the reader with a convenient means of identifying elements of the invention in the Specification and Drawings. This list is not intended to delineate or narrow the scope of the Claims.

LIST OF REFERENCE CHARACTERS

10 Cylinder
10a Axis of revolution of cylinder
10b Central aperture
11 Flared end of cylinder
12 Plate
12a Tool spindle center-line (Axis of revolution)
15 Tool Mount Assembly
16 Motor assembly
18 Housing
20 Retainer plate
22 Rotor
24 Shaft
26 Drive motor
28 Spur gear
30 Ring gear
32 Mounting flange
34 Gear box housing
36 Side stiffening plate
38 Ball shaft
40 Ball bushing
42 Ball bushing mount
44 Ball shaft mount
46 Extension for tail stock support
48 Base plate
50 Motor mount slide plate
52 Roller fill thrust position
54 Cutter full thrust position
56 Workpiece frame
58 Inserts
60 Hinge
62 Hinge motion limiter
64 Lever
66 Latch
68 Ball shaft
70 Thrust pivot frame
72 Thrust mechanism
74 Thrust pivot hook
76 Handle
76a Idle
76b Initial contact
76c Initial thrust
76d Half thrust
76e Full thrust
80 Cutter advance drive motor
100 Cutting Tool Drive Assembly
101 Tool bit holder subassembly
101A Body
101B Bit holder
101C Slot
101D Bit
101E Horizontal rear cam roller slot
102 Tool bit holder guide clamp
103 Cam bearing
104A Tool bit guide clamp mount
104B Machine head mounting plate
105 Rotor
105A Forward portion of rotor
105B Step portion of rotor
105C Rear portion of rotor
106 Rotor ring gear
107 Cutter advance cam shaft
107A Central portion of shaft
107B Cutter advance eccentric cam roller
107C Cam roller flange
107D Spiral channel cup on advance cam shaft
107E Spiral guidance channel
108 Cam pin housing longitudinal guide cup
108A Body portion of guide cup
108B Front face
108C Front hole
108D Central chamber
108E Straight longitudinal guidance slot
108F Rear hole
109 Cam actuating housing
109A Body of cam actuating housing
109B Front face
109C Central chamber of cam actuating housing
109D Rear flange
109E Cam pin hole
110 Cam pin
110A Upper portion of cam pin
110B Middle portion of cam pin
110C Lower portion of cam pin
110D Rear fitting
111 Lead screw bearing
112 Lead screw nut
113 Traveling thrust bearing
114 Control rod base 114A Front flange of control rod base
114B Hole in control rod base
115 Lead screw shaft
115A Rear portion of shaft
115B Slotted end of shaft
115C Threaded portion of shaft
115D Forward reduced portion of shaft
116 Longitudinal position control rod
117 Shaft bearing retainer
118 Ring bearing retainer
119 Bearing lock ring
120 Fixed thrust bearing
121 Lock ring pin
122 Motor mount
123 Cutter advance mechanism drive motor shaft
123A Body portion
123B Flange
123C Projection
123D Pin
124 Adjustable optical sensor for longitudinal distance control
125 Optical speed control
126 Optical sensor adjustable mount
127 Optical sensor actuator
128 Encoder board
200 Vertical Boring Mill
202 Spindle rotation motor
204 Z-axis spindle motor
206 Tool advance motor
208 Spindle
210 Tool bit holder
210A Tool bit holder head
211 Tool bit
212 Workpiece
214 X-Y table
216A Drill bit
216B End mill
218 X-axis motor
220 Y-axis motor
R Radial direction
X Horizontal side-to-side axis
Y Front-to-back axis
Z Vertical axis

What is claimed is:

1. An apparatus for forming a recess in a workpiece (212) comprising:
    a longitudinal motion means for supplying a precisely controllable linear movement (L);
    said longitudinal motion means including
        a cam pin housing longitudinal guide cup (108); said cup (108) having a straight longitudinal guidance slot (108E),
        a cam actuating housing (109); said cam actuating housing (109) having a cam pin (110);
            said straight longitudinal guidance slot (108E) being adapted to receive said cam pin (110) and to allow said cam pin (110) to slide in said straight longitudinal guidance slot (108E);
    a first transmission means for converting said precisely controllable linear movement (L) to an exact rotational motion (R); said first transmission means being coupled to and driven by said longitudinal motion means; said first transmission means including
        a cutter advance cam shaft (107); said cutter advance cam shaft (107) having an eccentric cam roller (107B) disposed at one end and a spiral guidance channel (107E) disposed at an opposite end; and
        said spiral guidance channel (107E) being disposed to receive said cam pin (110); said cam pin (110) for imparting said exact rotational motion to said cutter advance cam shaft (107);
    a second transmission means for converting said exact rotational motion (R) to a highly accurate boring displacement (D);
    said second transmission means including
        a body (101A); said body (101A) having a tool bit holder slot (101C) and a horizontal cam roller slot (101E);
        a tool bit holder (101); said tool bit holder (101B) being disposed to slide in said tool bit holder slot (101C); and
        a tool bit (101D); said tool bit (101D) being held by said tool bit holder (101B);
        said horizontal cam roller slot (101E) being disposed to receive said eccentric cam roller (107B) to convert said exact rotational motion (R) to a highly accurate boring displacement (D) which brings said tool bit (101D) to bear upon said workpiece (212).

2. An apparatus as claimed in claim 1, in which said longitudinal motion means and said first and second transmission means are each operated and controlled independently.

3. A tool for forming a contour in a workpiece (212) comprising:
    a spindle (208);
    a first spindle rotation means (202) for providing rotational motion to said spindle (208); said first spindle rotation means (202) being coupled to said spindle (208);
    a Z-axis movement means (204) for providing motion along the Z-axis to said spindle (208); said Z-axis spindle movement means (204) being coupled to said spindle (208);
    a tool bit holder (101B); said tool bit holder (101B) being coupled to said spindle (208);
    a tool bit (211); said tool bit (211) being held by said tool bit holder (101B); and
    a radial movement means (206) for providing radial motion to said tool bit (211);
    said first spindle rotation means (202), said Z-axis spindle movement means (204) and said radial tool bit movement means (206) each being operated and controlled independently;
    said tool bit (211) being adapted to form a contour in said workpiece (212); said tool bit holder (101B) including a rear cam roller slot (101E);
    a spindle advance cam shaft (107A) including a spiral channel (107E) and a cam pin (110);
    said cam pin (110) having a lower portion (101C);
    said spiral channel (107E) in said spindle advance cam shaft (107A) being adapted to receive said lower portion of said cam pin (110C).

4. An apparatus as claimed in claim 3, further comprising:

a lead screw (115);

said lead screw (115) being coupled to said cam pin (110);

said lead screw (115) for forcing said pin (110) forward and backward.

5. An apparatus as claimed in claim 4, in which:

said first spindle rotation means (202) is coupled to said lead screw (115) to supply rotary motion to said spindle (208).

6. An apparatus as claimed in claim 5, further comprising:

an optical sensor and control (124, 125) is coupled to said first spindle motion means (202) for sensing and controlling the action of said first spindle rotation means (202).

7. An apparatus as claimed in claim 3, in which said spiral channel (107E) is formed at an angle of approximately thirty degrees from the central axis of said tool bit advance cam shaft (107A).

* * * * *